(12) United States Patent
Aiba

(10) Patent No.: US 12,544,964 B2
(45) Date of Patent: Feb. 10, 2026

(54) INJECTION MOLDING MACHINE AND VISCOSITY MEASUREMENT METHOD

(71) Applicant: Sodick Co., Ltd., Kanagawa (JP)

(72) Inventor: Shuji Aiba, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 102 days.

(21) Appl. No.: 18/759,993

(22) Filed: Jun. 30, 2024

(65) Prior Publication Data

US 2025/0018627 A1 Jan. 16, 2025

(30) Foreign Application Priority Data

Jul. 13, 2023 (JP) .................................. 2023-115506

(51) Int. Cl.
  *B29C 45/76* (2006.01)
  *B29C 45/77* (2006.01)
(52) U.S. Cl.
  CPC .......... *B29C 45/7646* (2013.01); *B29C 45/77* (2013.01); *B29C 2945/76006* (2013.01); *B29C 2945/7604* (2013.01); *B29C 2945/7605* (2013.01); *B29C 2945/76204* (2013.01)
(58) Field of Classification Search
  CPC .......... B29C 45/76–82; B29C 2045/7606–828
  See application file for complete search history.

(56) References Cited

U.S. PATENT DOCUMENTS 3,924,840 A * 12/1975 Nelson, Jr. ............. G05D 24/02
  324/140 D
4,164,531 A * 8/1979 Shiraki ................. B29C 45/561
  264/328.7
(Continued)

FOREIGN PATENT DOCUMENTS

JP H05329864 A * 12/1993 ......... B29C 45/7646
JP H06114632 4/1994
(Continued)

*Primary Examiner* — Benjamin A Schiffman
(74) *Attorney, Agent, or Firm* — JCIPRNET

(57) ABSTRACT

An injection molding machine and a viscosity measurement method of the disclosure are provided with an injection cylinder to which a viscosity measurement unit is attachable and detachable and a control device. When setting an inner diameter of the injection cylinder or an outer diameter of the injection shaft as D. For a capillary installed to the viscosity measurement unit, a capillary inner diameter is set as d. By respectively using three or more values $\gamma_k$ of the shear rate, k being a natural number, the control device is configured to calculate injection velocities $V_k$ based on Formula (1) and automatically sets a value of the injection velocity $V_k$ within a predetermined range, among the calculated injection velocities, as an injection velocity at a time of viscosity measurement.

[Formula (1)]

$$V_k = \frac{d^3}{8D^2}\gamma_k \quad (1)$$

20 Claims, 15 Drawing Sheets

(56) References Cited

U.S. PATENT DOCUMENTS

| | | | | |
|---|---|---|---|---|
| 4,816,197 A * | 3/1989 | Nunn | ............. | B29C 45/7693 |
| | | | | 264/40.6 |
| 4,850,217 A * | 7/1989 | Nunn | ............. | B29C 45/7693 |
| | | | | 73/54.11 |
| 9,283,695 B1 * | 3/2016 | Tseng | ............. | B29C 45/7693 |
| 10,946,573 B2 * | 3/2021 | Aiba | ............. | B29C 45/78 |
| 10,974,424 B2 * | 4/2021 | Aiba | ............. | B29C 45/2673 |
| 10,974,425 B2 * | 4/2021 | Aiba | ............. | B29C 45/2675 |
| 11,897,176 B2 * | 2/2024 | Aiba | ............. | B29C 45/54 |
| 11,911,944 B2 * | 2/2024 | Aiba | ............. | B29C 45/80 |
| 12,409,593 B2 * | 9/2025 | Aiba | ............. | B29C 45/76 |
| 2024/0123666 A1 * | 4/2024 | Sako | ............. | B29C 45/2701 |

FOREIGN PATENT DOCUMENTS

| | | |
|---|---|---|
| JP | 2004142204 | 5/2004 |
| JP | 2010240761 | 10/2010 |
| JP | 2024135201 A * | 10/2024 |

* cited by examiner

INJECTION MOLDING MACHINE AND VISCOSITY MEASUREMENT METHOD

CROSS-REFERENCE TO RELATED APPLICATION

This application claims the priority benefit of Japan application serial no. 2023-115506, filed on Jul. 13, 2023. The entirety of the above-mentioned patent application is hereby incorporated by reference herein and made a part of this specification.

BACKGROUND

Technical Field

The disclosure relates to an injection molding machine and a viscosity measurement method using the injection molding machine.

Description of Related Art

In injection molding, the viscosity of molten resin is one of the factors affecting the product quality. In viscosity measurement using a capillary rheometer, it is difficult to precisely reproduce the conditions during actual molding. Therefore, in the inline screw injection molding machine of Patent Document 1, the injection pressure at the time of injecting the molten resin is obtained in a state in which the mold does not contact the nozzle by using a load cell provided at the screw rear end, thereby calculating the viscosity of the molten resin.

PRIOR ART DOCUMENT(S)

Patent Document(s)

[Patent Document 1] Japanese Laid-open No. 2004-142204

However, while Patent Document 1 proposes to set the setting value of the injection velocity at the time of viscosity measurement constant within a predetermined range, it does not provide any guidelines as to what specific numerical value to use. Currently, the setting value of the injection velocity at the time of viscosity measurement relies on the operator's judgment, and the value may be inappropriate. In addition, since the setting value of the injection velocity for every viscosity measurement is not limited to being constant, it is not easy to make a simple comparison using data of different lots of the molding material or different measurement dates.

SUMMARY

An injection molding machine according to an aspect of the disclosure includes: an injection cylinder, to which a viscosity measurement unit is attachable and detachable; an injection shaft, inside the injection cylinder; an injection driving device, driving the injection shaft; and a control device, controlling the injection driving device, so as to drive the injection shaft forward and rearward. When setting an inner diameter of the injection cylinder or an outer diameter of the injection shaft as D, and, for a capillary die and/or a slit die installed to the viscosity measurement unit, a capillary inner diameter is set as d and a slit length and a slit width are respectively set as B and H, the control device is configured to, by respectively using three or more values $\gamma_k$ of the shear rate, k being a natural number, calculate injection velocities $V_k$ based on Formula (1) or (2) below and automatically set a value of the injection velocity $V_k$ within a predetermined range, among the calculated injection velocities, as an injection velocity at a time of viscosity measurement.

[Formula (1)]

$$V_k = \frac{d^3}{8D^2}\gamma_k \quad (1)$$

[Formula (2)]

$$V_k = \frac{2BH^2}{3\pi D^2}\gamma_k \quad (2)$$

In addition, a viscosity measurement method according to another aspect of the disclosure is a viscosity measurement method of the injection molding machine. The viscosity measurement method includes: a process of causing the molding material to flow in the capillary die or the slit die installed to the measurement cylinder via the measurement cylinder of the viscosity measurement unit having the pressure sensor from the injection cylinder at the injection velocity $V_k$; a process of acquiring a pressure value of the molding material flowing in the measurement cylinder by using the pressure sensor; and a process of calculating a viscosity $\eta_k$ in accordance with the injection velocity $V_k$ by using the pressure value. The process of causing the molding material to flow includes: a process of, by using the control device of the injection molding machine, calculating the injection velocity $V_k$ in accordance with each of the three or more values $\gamma_k$ of the shear rate set in advance based on Formula (1) or (2), and automatically setting the value of the injection velocity $V_k$ in the predetermined range, among the calculated injection velocities, as the injection velocity at the time of viscosity measurement.

DESCRIPTION OF THE EMBODIMENTS

According to at least one embodiment of the disclosure, it is possible to accurately execute viscosity measurement with reduced variation resulting from the operator.

In the following, the embodiments of the disclosure are described with reference to the drawings. The respective properties shown in the embodiments below can be combined with each other. In addition, the invention is established independently for each property.

1. Overall Configuration of the Injection Molding Machine

Figure 1:
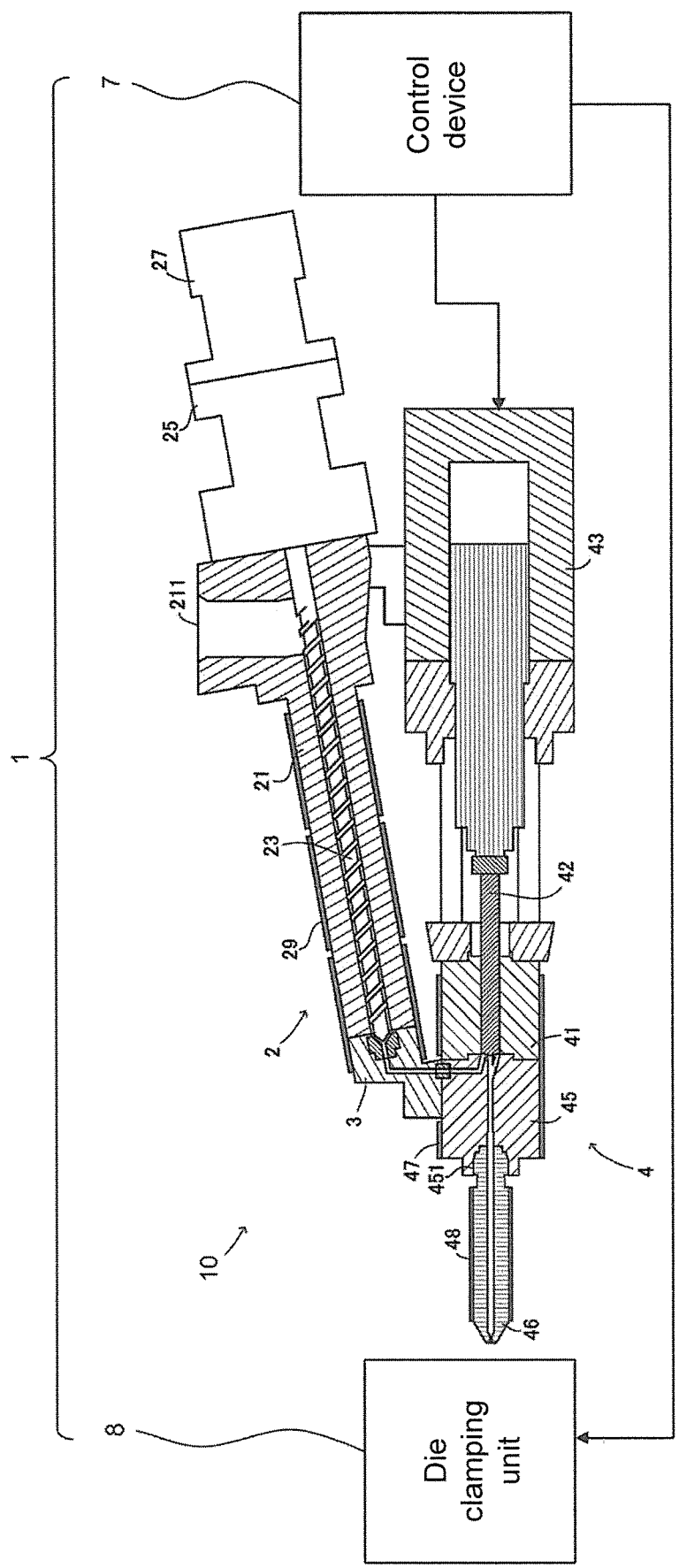
FIG. 1 is a schematic view illustrating an example of an applicable injection molding machine according to an embodiment of the disclosure.

FIG. 1 is a schematic view illustrating an example of an applicable injection molding machine according to the disclosure. An injection molding machine 1 as shown in FIG. 1 includes an injection unit 10, a mold clamping unit 8, and a control device 7. The injection unit 10 injects a molding material. The mold clamping unit 8 opens and closes the mold. The control device 7 controls the operations of these units. The injection unit 10 shown in FIG. 1 is schematically shown in a cross-section.

The injection unit 10 includes a plasticizing device 2 and an injection device 4. The injection device 4 includes an injection cylinder 41 and an injection shaft 42 located in a cylinder hole of the injection cylinder 41. Here, "injection shaft" refers to an injection plunger or an injection screw disposed inside the injection cylinder. In the following, "injection plunger" is simply referred to as "plunger". The injection screw is, for example, an inline screw, etc., to be described afterwards. The injection shaft 42 shown in FIG. 1 is a plunger formed to be reciprocally operable in the cylinder hole of the injection cylinder 41 along the axis of the injection cylinder 41.

The injection device 4 has an injection driving device 43. The injection driving device 43 drives the injection shaft 42 forward and rearward inside the injection cylinder 41 based on an instruction from the control device 7. The injection driving device 43 can adopt various driving means, such as a hydraulic cylinder, an electric motor, etc.

In the configuration shown in FIG. 1, the injection cylinder 41, the injection shaft 42, and the injection driving device 43 are substantially disposed linearly in order. In the following, the side of the injection cylinder 41 of the injection device 4 is referred to as "front side" or "front", and the side of the injection driving device 43 is referred to as "rear side" or "rear".

In the example shown in FIG. 1, a nozzle cylinder 45 is connected with the tip of the injection cylinder 41. A heater 47, such as a band heater, is wound around the outer peripheral surface of the injection cylinder 41 and the nozzle cylinder 45, for example, and the injection cylinder 41 and the nozzle cylinder 45 is heated to a predetermined temperature by the heater 47.

The nozzle cylinder 45 has a nozzle installation hole 451 on a side opposite to the injection cylinder 41. The nozzle cylinder 45 is configured for the injection nozzle 46 to be attachable and detachable. For example, the inner wall of the nozzle installation hole 451 is provided with a female screw part. The rear end of the injection nozzle 46 is provided with a male screw part in a shape corresponding to the female screw part of the nozzle installation hole 451, so as to be attachable and detachable with respect to the nozzle cylinder 45. Like the injection cylinder 41 and the nozzle cylinder 45, the heater 48, such as a band heater, is wound around the outer peripheral surface of the injection nozzle 46, for example, and the injection nozzle 46 is heated to a predetermined temperature by the heater 48.

In this example, a junction 3 is connected with the side surface of the nozzle cylinder 45. The plasticizing device 2 is connected with the nozzle cylinder 45 via the junction 3. The plasticizing device 2 includes a plasticizing cylinder 21, a plasticizing screw 23 located in a cylinder hole of the plasticizing cylinder 21, a backflow prevention device 25, a plasticizing screw driving device 27 that rotates the plasticizing screw 23, and a heater 29. The plasticizing cylinder 21 is provided with a hopper 211 at the rear end.

Inside the nozzle cylinder 45, a supply flow passage connecting the junction 3 and the injection cylinder 41 and a discharge flow passage connecting the injection cylinder 41 and the injection nozzle 46 are provided. The injection molding machine 1 is a screw preplasticating injection molding machine.

Figure 2:
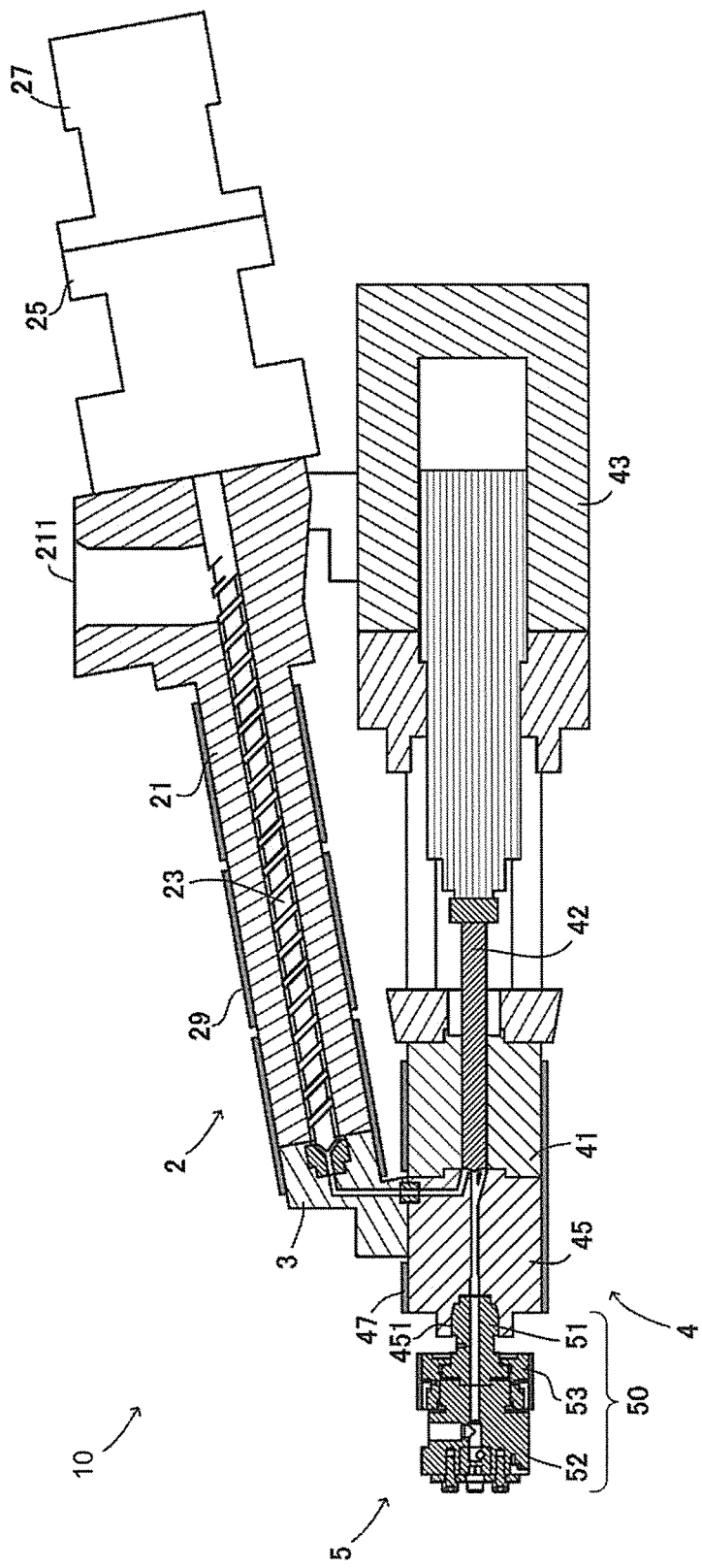
FIG. 2 is a schematic cross-sectional view illustrating an injection unit 10 in a state in which a viscosity measurement unit 5 is installed to a nozzle cylinder 45 in place of an injection nozzle 46.

FIG. 2 is a schematic cross-sectional view illustrating the injection unit 10 in a state in which a viscosity measurement unit 5 is installed to the nozzle cylinder 45 in place of the injection nozzle 46.

Figure 15:
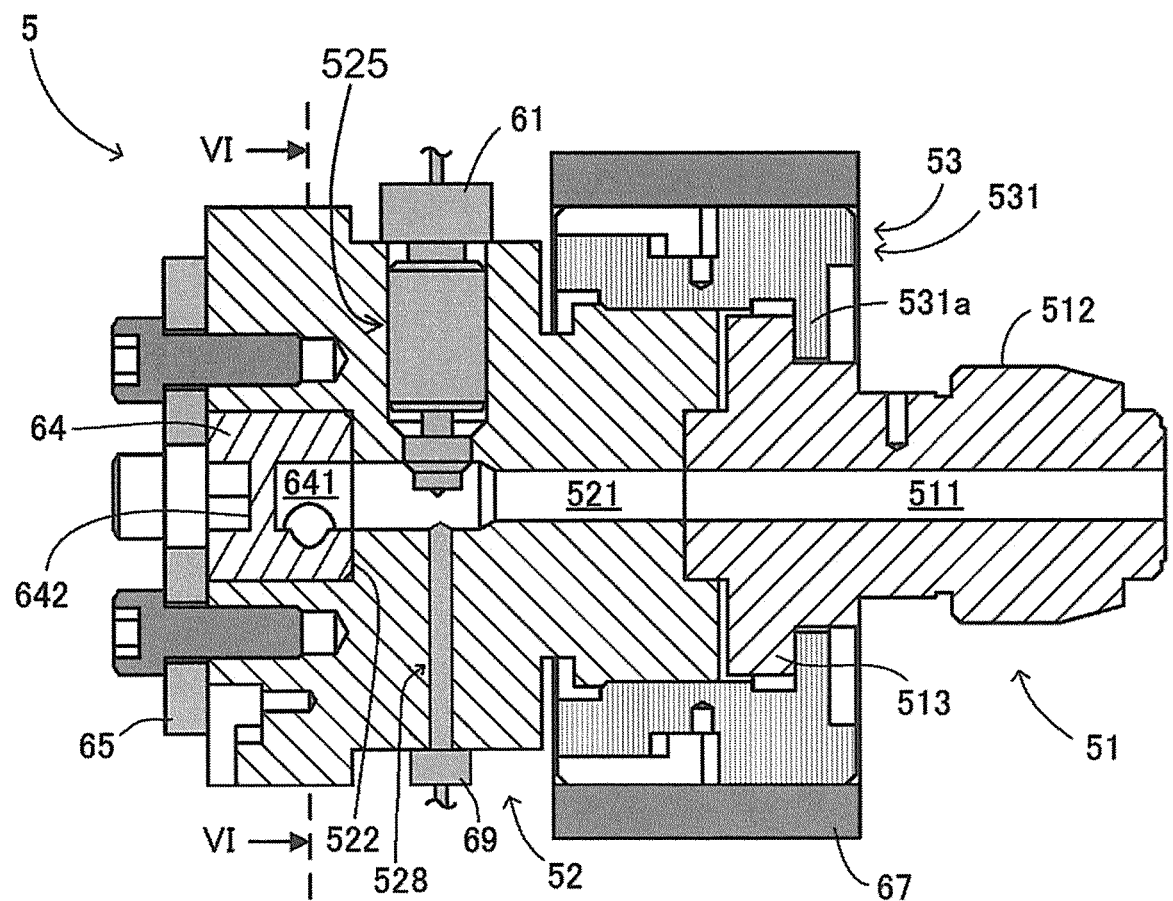
FIG. 15 is a schematic view illustrating another exemplary vertical cross-section of the viscosity measurement unit 5.

The viscosity measurement unit 5 includes a measurement cylinder 50 in which a flow passage is formed inside. In the configuration shown in FIG. 2, the measurement cylinder 50 includes a rear cylinder 51, a front cylinder 52, and a fastener 53. The rear cylinder 51 and the front cylinder 52 are connected by using the fastener 53. For example, the fastener 53 is a cover nut 531. A male screw part is formed at the rear part of the front cylinder 52. The male screw part is in a shape corresponding to a female screw part formed on the inner side of the cover nut 531. The flow passage inside the front cylinder 52 is in communication with the flow passage inside the rear cylinder 51. At least one of a capillary die and a slit die to be described afterwards is installed to the front cylinder 52. A pressure sensor is installed to the front cylinder 52. The pressure sensor measures the pressure of the fluid (typically a molten resin) flowing in the flow passage. A temperature sensor 69 is installed to the front cylinder 50. The temperature sensor 69 measures the temperature of the fluid (typically a molten resin) flowing in the flow passage. For example, as shown in FIG. 15, the temperature sensor 69 measuring the temperature of the fluid flowing in the flow passage may also be installed to the front cylinder 52. The temperature sensor 69 is connected with the control device 7. For the temperature sensor 69, various sensors able to measure the temperature can be adopted. The temperature sensor is, for example, a thermocouple.

As schematically shown in FIG. 2, by inserting the rear end of the rear cylinder 51 into the nozzle installation hole 451 of the nozzle cylinder 45, the viscosity measurement unit 5 is connected with the nozzle cylinder 45. The nozzle cylinder 45 is configured so that not only the injection nozzle 46 but the viscosity measurement unit 5 is attachable and detachable. Here, the injection nozzle 46 and the viscosity measurement unit 5 can be said to be attachable and detachable to the injection cylinder 41 indirectly by using the nozzle cylinder 45. The nozzle cylinder 45 may also be configured as a portion of the injection cylinder 41. In this case, the injection nozzle 46 and the viscosity measurement unit 5 can be said to be attachable and detachable directly to the injection cylinder 41. In the specification, "the injection cylinder 41 to which the viscosity measurement unit 5 is attachable and detachable" is interpreted as including both the injection cylinder 41 to which the viscosity measurement unit 5 is directly attachable and detachable and the injection cylinder 41 to which the viscosity measurement unit 5 is indirectly attachable and detachable.

The injection molding machine 1 is able to measure the viscosity of the molding material (e.g., molten resin) flowing in the viscosity measurement unit 5 in a state in which the viscosity measurement unit 5 is installed to the injection cylinder 41 via the nozzle cylinder 45. The injection molding machine 1, for example, is configured so that the operation mode is switchable between the molding mode and the viscosity measurement mode based on the instruction of the control device 7. The molding mode is used at the time of molding an actual product.

In the viscosity measurement mode, the control device 7 of the injection molding machine 1 calculates an injection velocity based on a predetermined Formula by using a predetermined value of a shear rate and a value of a parameter determined from the geometric properties of the injection cylinder 41. The control device 7 then automatically sets the calculated value to the injection velocity at the time of viscosity measurement, and operates the injection shaft 42 at the injection velocity to discharge the molding material from the viscosity measurement unit 5.

At this time, by using the pressure sensor of the viscosity measurement unit 5, the value of the pressure of the molten resin that is the molding material in a state close to actual molding can be obtained. The control device 7 calculates the viscosity of the molding material from a predetermined Formula based on the shear rate calculated used for calculating injection velocity in addition to the measurement value obtained from the pressure sensor and the value of the parameter defining the shape of the slit or the capillary of the die installed to the viscosity measurement unit 5.

According to the embodiment of the disclosure, based on the predetermined shear rate, the injection velocity used in the viscosity measurement mode can be set automatically. Therefore, it is possible to carry out viscosity measurement accurately in a form not depending on the experience or the intuition of the operator. At this time, in the embodiment of the disclosure, three or more values selected from an appropriate range are prepared as the shear rates for calculating the injection velocities. The injection velocity is calculated for each of the shear rates, and the injection velocity corresponding to each shear rate is presented to the operator as a candidate at the time of viscosity measurement. However, among the injection velocity candidates, a value out of the predetermined range is not presented to the operator. In other words, the injection velocity suitable for viscosity measurement is automatically calculated on the side of the injection molding machine and set as a condition at the time of viscosity measurement.

2. Details of the Viscosity Measurement Unit

Figure 3:
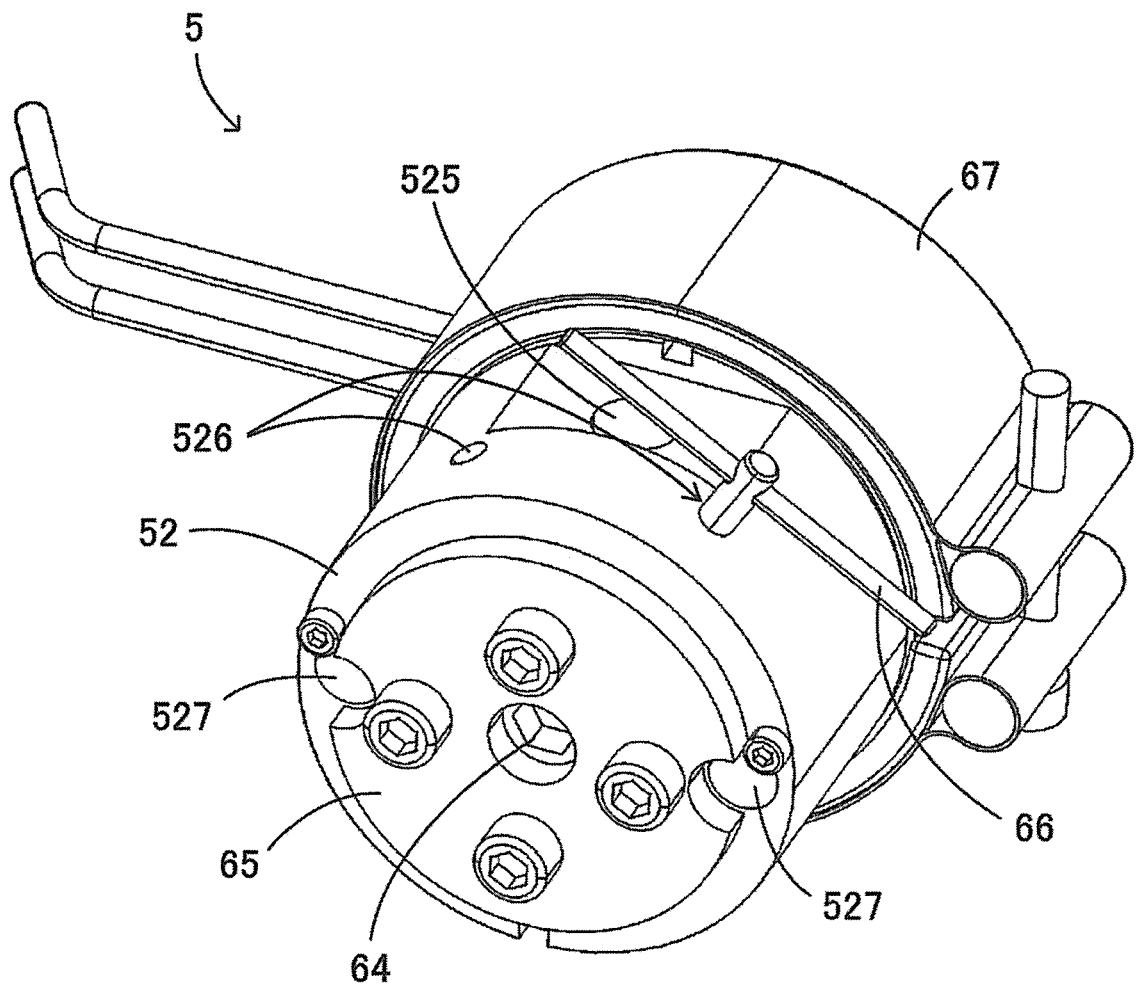
FIG. 3 is a perspective view illustrating an example of the appearance of the viscosity measurement unit 5.
Figure 4:
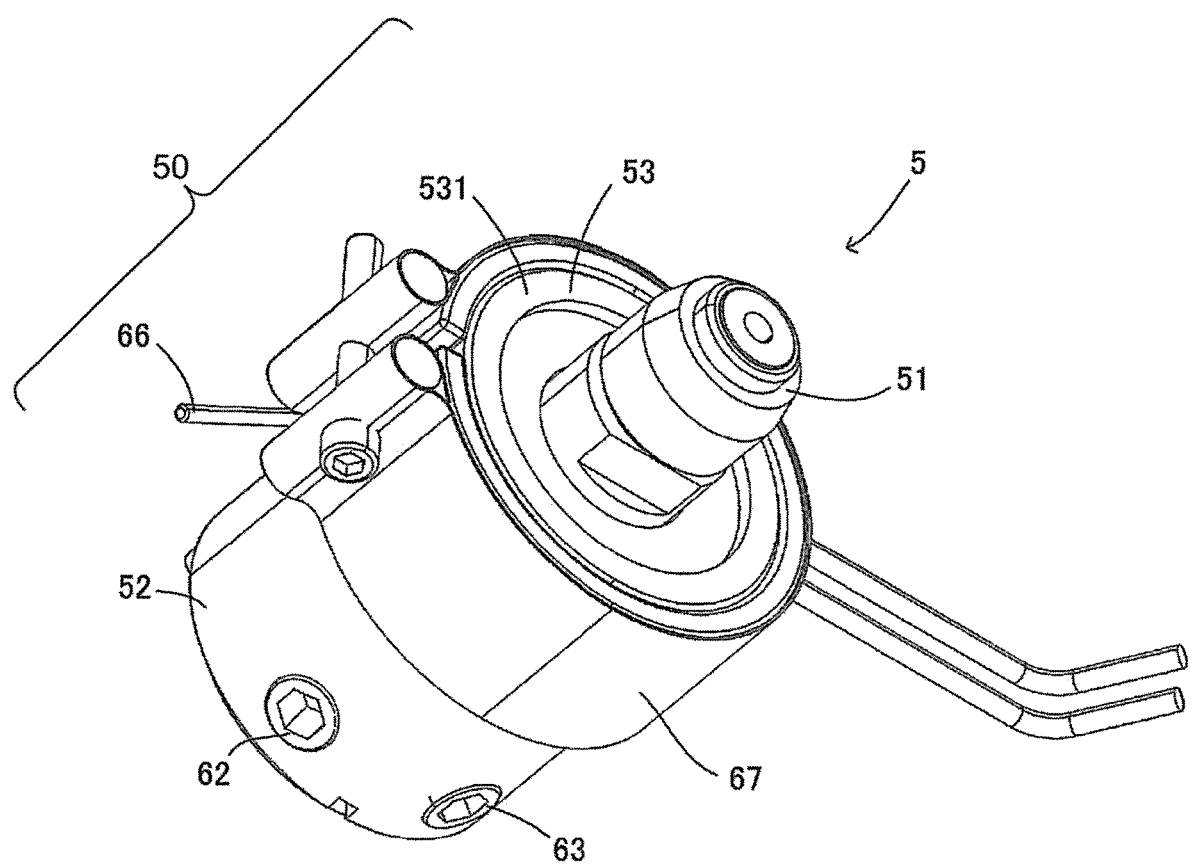
FIG. 4 is a perspective view illustrating another example of the appearance of the viscosity measurement unit 5.
Figure 5:
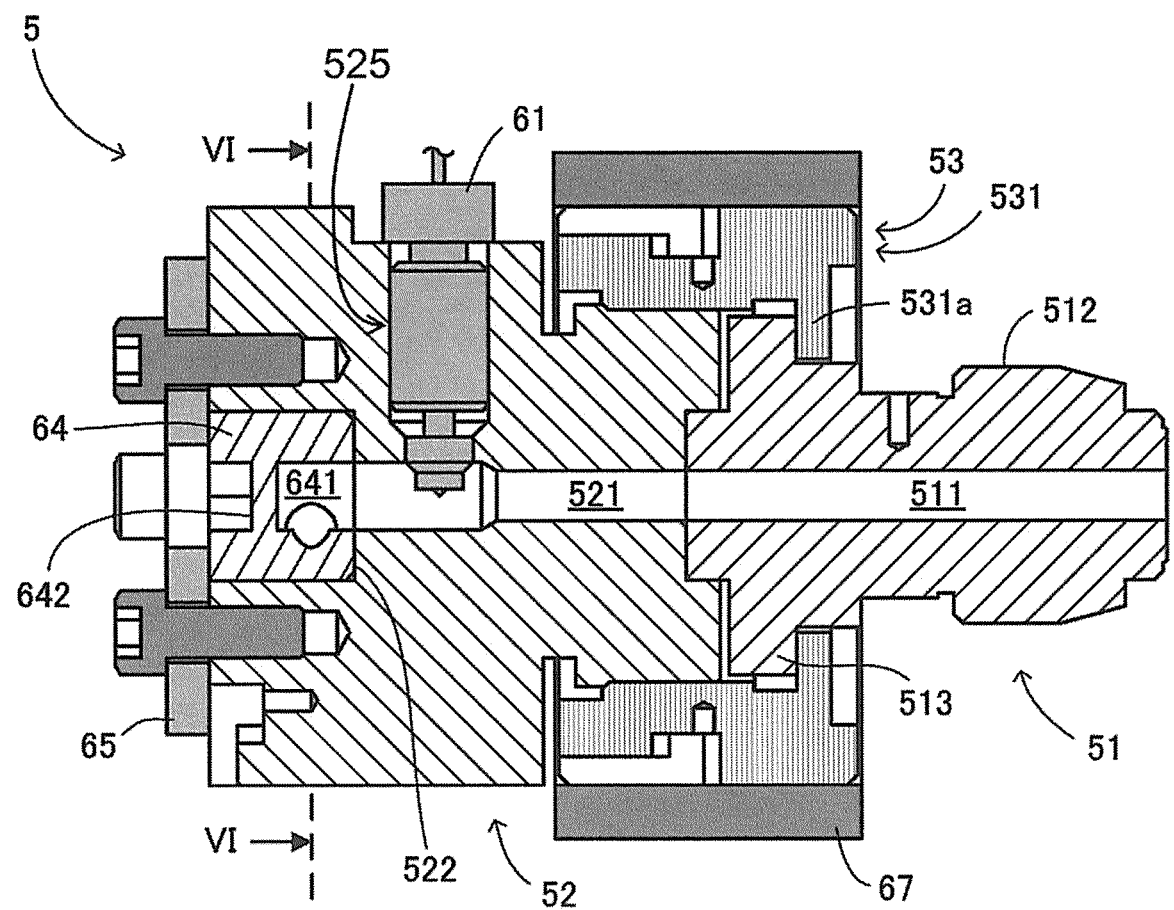
FIG. 5 is a schematic view illustrating an exemplary vertical cross-section of the viscosity measurement unit 5.

FIGS. 3 and 4 illustrate an example of the appearance of the viscosity measurement unit 5 shown in FIG. 2. FIG. 5 is a schematic view illustrating an example of a cross-section at the time when the viscosity measurement unit 5 is cut at a plane including the flow passage inside the measurement cylinder 50. The viscosity measurement unit 5 includes the measurement cylinder 50 having three components, i.e., the rear cylinder 51, the front cylinder 52, and the cover nut 531. The viscosity measurement unit 5 may also further include a band heater 67 wound around the outer peripheral surface of the cover nut 531.

The viscosity measurement unit 5 further includes a flow passage switching pin 64 and a fixed plate 65. The flow passage switching pin 64 is inserted into a flow passage switching pin installation hole 522 to be rotatable around the axis of the front cylinder 52 inside the flow passage switching pin installation hole 522 provided in the vicinity of the center of the front cylinder 52. The fixed plate 65 is a plate member fixed to the front surface of the front cylinder 52 by using a bolt, etc., and has a through hole in the vicinity of the center. A portion of the flow passage switching pin 64 is exposed from the through hole provided in the vicinity of the center of the fixed plate 65. The fixed plate 65 prevents the flow passage switching pin 65 from falling off from the front cylinder 52 by covering another portion of the flow passage switching pin 64.

The front cylinder 52 has a first hole part 525 and two second hole parts 526 open on the side surface thereof. The first hole part 525 is provided to install the pressure sensor 61 to be described afterwards to the front cylinder 52. The second hole part 526 is a through hole to be inserted by a positioning rod 66. Each second hole part 526 extends radially inside the front cylinder 52 from the opening on the side surface of the front cylinder 52 to the vicinity of the center of the front cylinder 52. In FIG. 3, one of the second hole parts 526 is shown in a state in which the positioning rod 66 having a T shape is inserted therein. The front cylinder 52 has third hole parts 527 at two positions on the front surface. The third hole part 527 is a space in which a heater is disposed therein. As shown in FIG. 15, the front cylinder 52 may also have a fourth hole part 528 open on a side surface thereof, so that the temperature sensor 69 to be described afterwards can be disposed.

The viscosity measurement unit 5 is further provided with a first capillary die 62 and a second capillary die 63 respectively installed to the measurement cylinder 50. In the example shown in FIG. 4, the dies 62, 63 are disposed at an interval in the circumferential direction on the side surface of the front cylinder 52 in a cylindrical shape.

The rear cylinder 51 has a flange 513 and a plug part 512. The flange 513 is a portion in contact with a wall surface 531a at the rear end of the cover nut 531 in a state in which the rear cylinder 51 and the front cylinder 52 are connected by using the cover nut 531. The wall surface 531a of the cover nut 531 serves to press the rear cylinder 51 toward the front cylinder 52. The plug part 512 of the rear cylinder 51 is a portion protruding rearward with respect to the cover nut 531 in the viscosity measurement unit 5, and is inserted into the nozzle installation hole 451 of the nozzle cylinder 45 at the time of installing the viscosity measurement unit 5 to the nozzle cylinder 45. A male screw part corresponding to the female screw part of the nozzle installation hole 451 is provided on the outer peripheral surface of the plug part 512. By fitting the female screw part and the male screw part, the plug part 512 is connected with the nozzle installation hole 451.

The rear cylinder 51 has a flow passage 511 therein. The flow passage 511 penetrates through the rear part cylinder 51 in the front-rear direction. The flow passage 511 is in communication with the flow passage inside the nozzle cylinder 45 in a state in which the viscosity measurement unit 5 including the measurement cylinder 50 is installed to the nozzle cylinder 45. The flow passage 511 of the rear cylinder 51 is also in communication with a flow passage 521 inside the front cylinder 52 in a state in which the rear cylinder 51 and the front cylinder 52 are connected.

The front cylinder 52 has a first hole part 525 on a side surface of the front cylinder 52. The first hole part 525 reaches the flow passage 521 extending in the axial direction of the front cylinder 52. The pressure sensor 61 is disposed inside the first hole part 525. The pressure sensor 61 is a pressure transducer for obtaining a value of the pressure of the molding material flowing through the flow passage 521. The flow passage 521 of the front cylinder 52 extends to a flow passage 641 provided in the flow passage switching pin 64 inside the flow passage switching installation hole 522.

Figure 6:
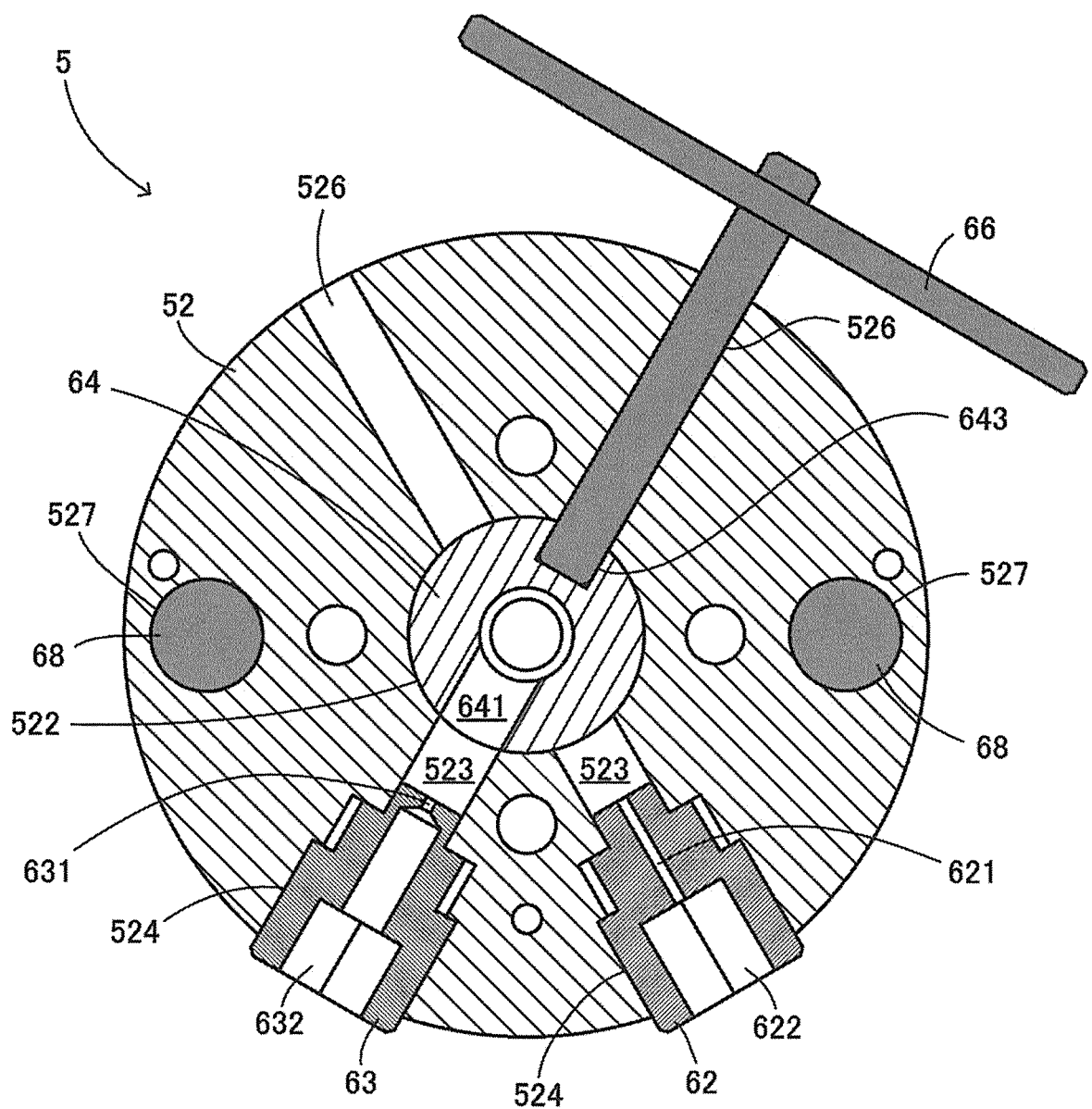
FIG. 6 is a schematic view illustrating a VI-VI cross-section of FIG. 5.

FIG. 6 is a schematic view illustrating a cross-section of the measurement cylinder 50 when viewed in the axial direction of the measurement cylinder 50. As schematically shown in a shaded circle in FIG. 6, the heater 68 is provided inside each third hole part 527 open on the front surface of the front cylinder 52. The heater 68 is, for example, a cartridge heater.

In an exemplary embodiment of the disclosure, the viscosity measurement unit 5 is configured so that two or more dies can be installed. The first capillary die 62 is installed to one of two die installation holes 524 provided on a side surface of the front cylinder 52 of the measurement cylinder 50, and the second capillary die 63 is installed to the other. The first capillary die 62 and the second capillary die 63 are dies of different specifications. More specifically, the first capillary die 62 and the second capillary die 63 respectively have a first capillary 621 and a second capillary 631, but are different in at least one of the inner diameters and the effective lengths of the capillaries.

The front cylinder 52 has two flow passages 523 respectively extending radially from the center of the front cylinder 52. One of the flow passages 523 is in communication with the first capillary 621 of the first capillary die 62, and the other is in communication with the second capillary 631 of the second capillary die 63.

In the example shown in FIG. 6, between the two flow passages 523, the flow passage 523 in communication with the second capillary 631 is connected with the flow passage 641 of the flow passage switching pin 64 disposed inside the flow passage switching pin installation hole 522. The flow path switching pin 64 has the flow passage 641 in a shape bent 90 degrees from the axial direction to the radial direction. In the state shown in FIG. 6, the molding material delivered from the injection device 4 of the injection unit 10 to the viscosity measurement unit 5 reaches the second capillary 63 via the flow passage 511 and the flow passage 521 as well as the flow passage 641 of the flow switching pin 64, and is discharged to the outside of the front cylinder 52 from the second capillary 631.

The flow passage switching pin 64 has a socket 642 open on the front surface of the flow passage switching pin 64. The socket 642 is a hexagonal hole, for example, and is arranged in a shape matching a hex wrench. In the embodiment, the flow passage switching pin 64 is located on the central axis of the front cylinder 52. From the state shown in FIG. 6, by removing the positioning rod 66 from the second hole part 526 and inserting a hex wrench into the socket 642 of the flow passage switching pin 64 via the through hole at the center of the fixed plate 65 to rotate the flow passage switching pin 64 in a counterclockwise manner, the passage through which the molding material flows can be switched to the side of the first capillary die 62.

The flow passage switching pin 64 has a concave part 643 on a side surface of the flow passage switching pin 64. The concave part 643 is provided at a position symmetric to the outlet of the passage 641 with respect to the center of the flow passage switching pin 64. In addition, when the outlet of the flow passage 641 is connected with either flow passage 523, the second hole part 526 is also located at a position symmetric to the outlet of the flow passage 641 with respect to the center of the flow passage switching pin 64. After the flow passage switching pin 64 is rotated, the positioning rod 66 is inserted into the other second hole part 526, and the tip of the positioning rod 66 is inserted into the concave part 643 of the flow passage switching pin 64, thereby fixing the orientation of the flow passage switching pin 64 inside the flow passage switching pin installation hole 522. Accordingly, the flow passage switching pin 64 inside the flow passage switching pin installation hole 522 can be prevented from being rotated unintentionally.

In this way, the injection molding machine 1 according to the disclosure is configured to be able to switch the discharge destination of the molding material between two or more dies of different specifications by arranging the viscosity measurement unit 5 to be attachable and detachable. In the example described herein, the number of each of the flow passage 523, the die installation hole 524, and the second hole part 526 provided in the front cylinder 52 is two. However, the disclosure is not limited to the example. In the front cylinder 52, the numbers of the flow passage 523, the die installation hole 524, and the second hole part 526 may also be provided in accordance with the number of dies to be used for viscosity measurement. It may also be configured that three or more dies are attachable and detachable with respect to the viscosity measurement unit 5. The dies may be disposed on the same plane perpendicular to the central axis of the front cylinder 52. However, the disclosure is not limited thereto. The dies may also be disposed at positions deviated from each other along the central axis of the front cylinder 52. As will be described in the following, the viscosity measurement unit 5 may also be configured so that a slit die is attachable and detachable, in addition to or in place of the capillary die.

In the embodiment, a female screw part is formed on the inner wall of each of the die installation holes 524, and a male screw part in a shape corresponding to the female screw part of the die installation hole 524 is formed on the outer peripheral surface of each of the first capillary die 62 and the second capillary die 63. In addition, sockets 622 and 632 allowing a tool to insert are respectively provided in the first capillary die 62 and the second capillary die 63. The sockets 622 and 632 are configured as hexagonal holes, for example, to be able to receive the tip of a hex wrench. By using a hex wrench, it is easy to attach or install a die to the die installation hole 524.

Figure 7:
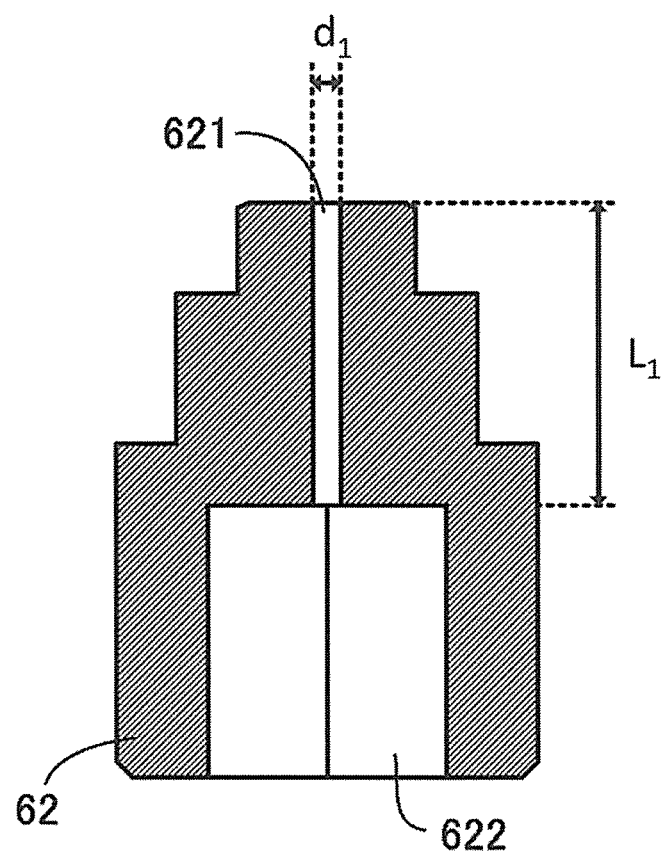
FIG. 7 is a schematic enlarged cross-sectional view illustrating a first capillary die 62.

FIG. 7 is a schematic enlarged view illustrating a cross-section of the first capillary die 62. The first capillary die 62 has the first capillary 621. The first capillary 621 has a cross-sectional circular shape having a predetermined inlet angle, inner diameter, and effective length. "$d_1$" and "$L_1$" shown in FIG. 7 respectively represent the inner diameter and the effective length of the first capillary 621. The inlet angle of the capillary indicates the magnitude of a tapered angle of a tapered part that may be formed at a capillary inlet. FIG. 7 illustrates the first capillary 621 without a tapered part. The inlet angle of a capillary without a tapered part is 180°.

Figure 8:
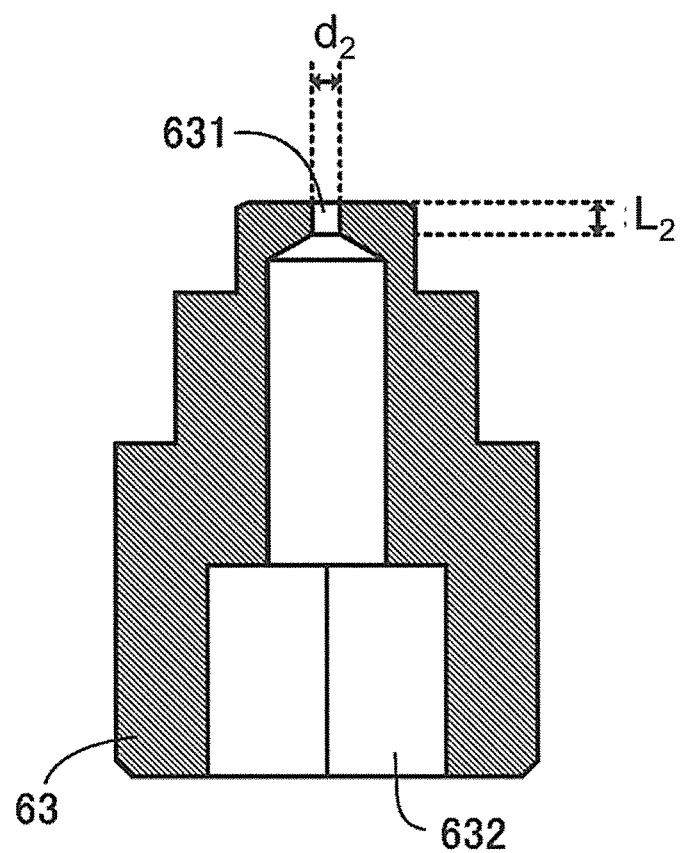
FIG. 8 is a schematic enlarged cross-sectional view illustrating a second capillary die 63.

FIG. 8 is a schematic enlarged view illustrating a cross-section of the second capillary die 63. Like the example shown in FIG. 7, the second capillary die 63 has a second capillary 631 without a tapered part. The second capillary 631 has an inner diameter $d_2$ and an effective length $L_2$ shorter than the effective length $L_1$ of the first capillary 621. For the case of description, in the following, unless otherwise specified, the inner diameter $d_2$ of the second capillary 631 is the same as the inner diameter $d_1$ of the first capillary 621 shown in FIG. 7.

Figure 9:
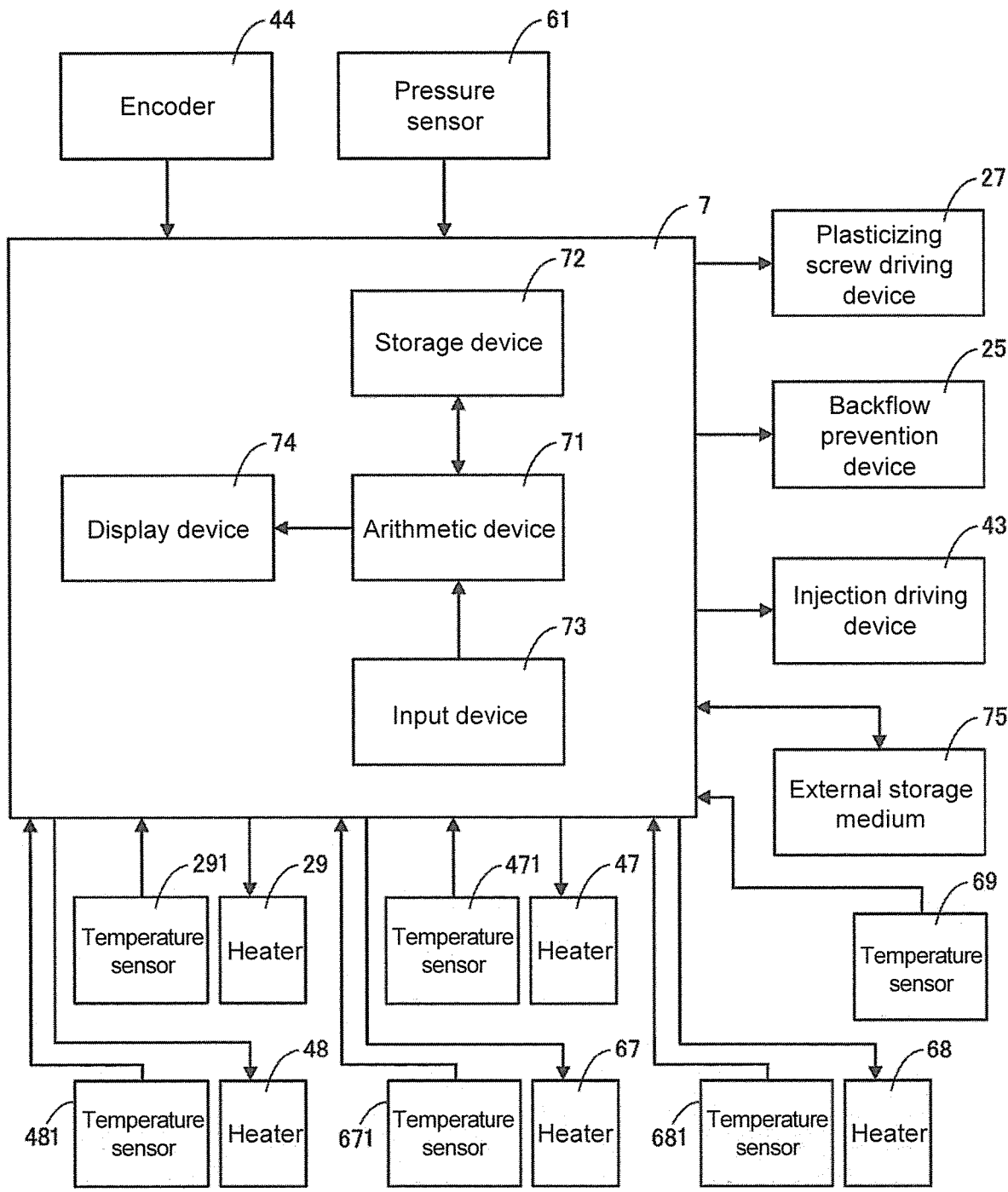
FIG. 9 is a block diagram illustrating the function of a control device 7 of the injection molding machine 1.

3. Operation Example of the Injection Molding Machine 1 in the Viscosity Measurement Mode FIG. 9 is a block diagram illustrating the function of the control device 7 of the injection molding machine 1. The control device 7 controls the injection unit 10 and the mold clamping unit 8, and calculates the viscosity of the molding material based on the pressure value of the molding material obtained by the viscosity measurement unit 5.

The control device 7 has an arithmetic device 71, a storage device 72, an input device 73, and a display device 74. The arithmetic device 71 is configured from an arithmetic circuit, such as a CPU, performs various arithmetic operations for controlling the respective parts of the injection molding machine 1, and performs an arithmetic operation relating to viscosity measurement. The storage device 72 stores programs for controlling the respective parts of the injection molding machine 1 and data required in the arithmetic operations of the arithmetic device 71. The storage device 72 may be realized by arbitrarily combining a RAM, a ROM, and an auxiliary storage device. These devices may also be realized by arbitrarily combining hardware and software components.

The input device 73 is, for example, an input interface such as a keyboard. The display device 74 is, for example, an output interface such as a liquid crystal display. The input device 73 and the display device 74 may respectively individual devices, and, may also be a single device in which the functions of both components are integrated, such as a touch panel. In the embodiment, an operation panel including both a touch panel and multiple physical buttons are shown as a device including provided with the functions of the input device 73 and the display device 74.

In the embodiment, the storage device 72 stores three or more different shear rates in advance. In the following, the values of the shear rates are comprehensively represented as $\gamma_k$, with k being a natural number. In the embodiment, the value $\gamma_k$ of the shear rate is selected from a region where the molten resin as the molding material behaves as a non-Newtonian fluid, that is, a region where the viscosity decreases as the shear rate increases. $\gamma_k$ stored in advance in the storage device 72 may be three or more different values distributed as widely as possible within the range of $1*10^1$ sec$^{-1}$ or more and $5*10^5$ sec$^{-1}$ or less ("*" represents multiplication). Alternatively, $\gamma_k$ stored in advance in the storage device 72 may be three or more different values within the range of $1*10^1$ sec$^{-1}$ or more $5*10^5$ sec$^{-1}$ and less and distributed as evenly as possible on a logarithmic scale. $\gamma_k$ stored in advance in the storage device 72 may be three or more different values distributed as widely as possible within the range of $1*10^1$ sec$^{-1}$ or more and $5*10^5$ sec$^{-1}$ or less and may be distributed as evenly as possible on a logarithmic scale.

In the embodiment, $\gamma_k$ stored in advance in the storage device 72 may be values selected from the range of $1*10^1$ sec$^{-1}$ or more and $5*10^5$ sec$^{-1}$ or less. As the value $\gamma_k$ of the shear rate, for example, the following five values may be adopted: $R*10^1$ sec$^{-1}$, $R*10^2$ sec$^{-1}$, $R*10^3$ sec$^{-1}$, $R*10^4$ sec$^{-1}$, and $R*10^5$ sec$^{-1}$, with R being a number of 1 or more and 5 or less.

As will be explained below, in an exemplary embodiment of the disclosure, an apparent viscosity $\eta_{ap}$ is calculated by a method according to JIS K 7199:1999.

The apparent viscosity $\eta_{ap}$ (in the unit of Pa·s) is obtained by dividing an apparent shear stress $\tau_{ap}$ (in the unit of Pa) by an apparent shear rate $\gamma_{ap}$ (in the unit of sec$^{-1}$). In the embodiment, in place of the apparent shear rate $\gamma_{ap}$, the shear rate $\gamma_k$ is used, and a viscosity $\eta_k$ is calculated as the apparent viscosity $\eta_{ap}$. That is, when the shear rate $\gamma_k$ within the range is applied, the viscosity $\eta_k$ is obtained by using Formula (3) below.

[Formula (3)]

$$\eta_k = \frac{\tau_{ap}}{\gamma_k} \quad (3)$$

In the case where a capillary die is used, the apparent shear stress $\tau_{ap}$ can be calculated based on Formula (4) below from the geometric shape of the capillary of the die and the measurement value (in the unit of Pa) of a pressure P of the molding material when the molding material flows at the shear rate $\gamma_k$ by using the die.

[Formula (4)]

$$\tau_{ap} = \frac{Pd}{4L} \quad (4)$$

In Formula (4), d represents the inner diameter (in the unit of mm) of the capillary provided in the capillary die, and L represents the effective length (in the unit of mm) of the capillary. For example, in the case where the first capillary die 62 is used, an inner diameter $d_1$ and an effective length $L_1$ (see FIG. 7) of the first capillary 621 may be used as d and L in Formula (4), respectively.

When the injection velocity of the molding material is set as V (in the unit of mm·sec$^{-1}$), it is known that the relationship between a volume flow rate Q (in the unit of mm$^3$·sec$^{-1}$), which is the volume of the molding material passing through the die per unit time and the apparent shear rate $\gamma_{ap}$ exhibits the relationship of Formula (5) as follows: In Formula (5) below, D represents the outer diameter (in the unit of mm) of the inject shaft or the inner diameter of the injection cylinder. If the configuration shown in FIG. 2 is adopted, the outer diameter of the injection shaft 42, that is, the outer diameter of the plunger disposed in the injection cylinder 41 may be adopted as D.

[Formula (5)]

$$\begin{aligned}\gamma_{ap} &= \frac{32Q}{\pi d^3} \\ &= \frac{32}{\pi d^3} \cdot \pi \left(\frac{D}{2}\right)^2 V \\ &= \frac{8D^2}{d^3} V\end{aligned} \quad (5)$$

If the shear rate $\gamma_k$ is used as the apparent shear rate $\gamma_{ap}$ in Formula (5), Formula (1) as follows is obtained.

[Formula (1)]

$$V_k = \frac{d^3}{8D^2}\gamma_k \quad (1)$$

In the embodiment, Formula (1) is used, and the injection velocities $V_k$ in accordance with the shear rates $\gamma_k$ held in advance in the storage device 72 are calculated for each $\gamma_k$. That is, if five values, for example, are stored in advance as the shear rate $\gamma_k$ in the storage device 72, five injection velocities $V_k$ are calculated. Each $V_k$ may be calculated by executing the arithmetic device 71.

In the embodiment of the disclosure, the pressure measurement of the molding material is performed under the injection velocity $V_k$ obtained in this way, and the viscosity $\eta_k$ of the molding material is calculated from Formulae (3) and (4). However, in the embodiment, among the injection velocities $V_k$ obtained from Formula (1), $V_k$ outside a predetermined range is not adopted as the injection velocity at the time of pressure measurement.

The predetermined range of the injection velocity is a range of 0.05 mm·sec$^{-1}$ or more and 200 mm·sec$^{-1}$ or less, for example. If the value of the injection velocity $V_k$ is within the range, it is possible to cope with a shear rate $\gamma_k$ up to about 1*10$^6$ sec$^{-1}$, although it still depends on the specification of the mold used.

The viscosity measurement of the molding material using the injection molding machine 1 is performed by installing the viscosity measurement unit 5 to the injection cylinder 41 of the injection unit 10. As will be described in the following, the viscosity measurement may also be executed by installing a slit die to the front cylinder 52 in place of the capillary die.

Figure 10:
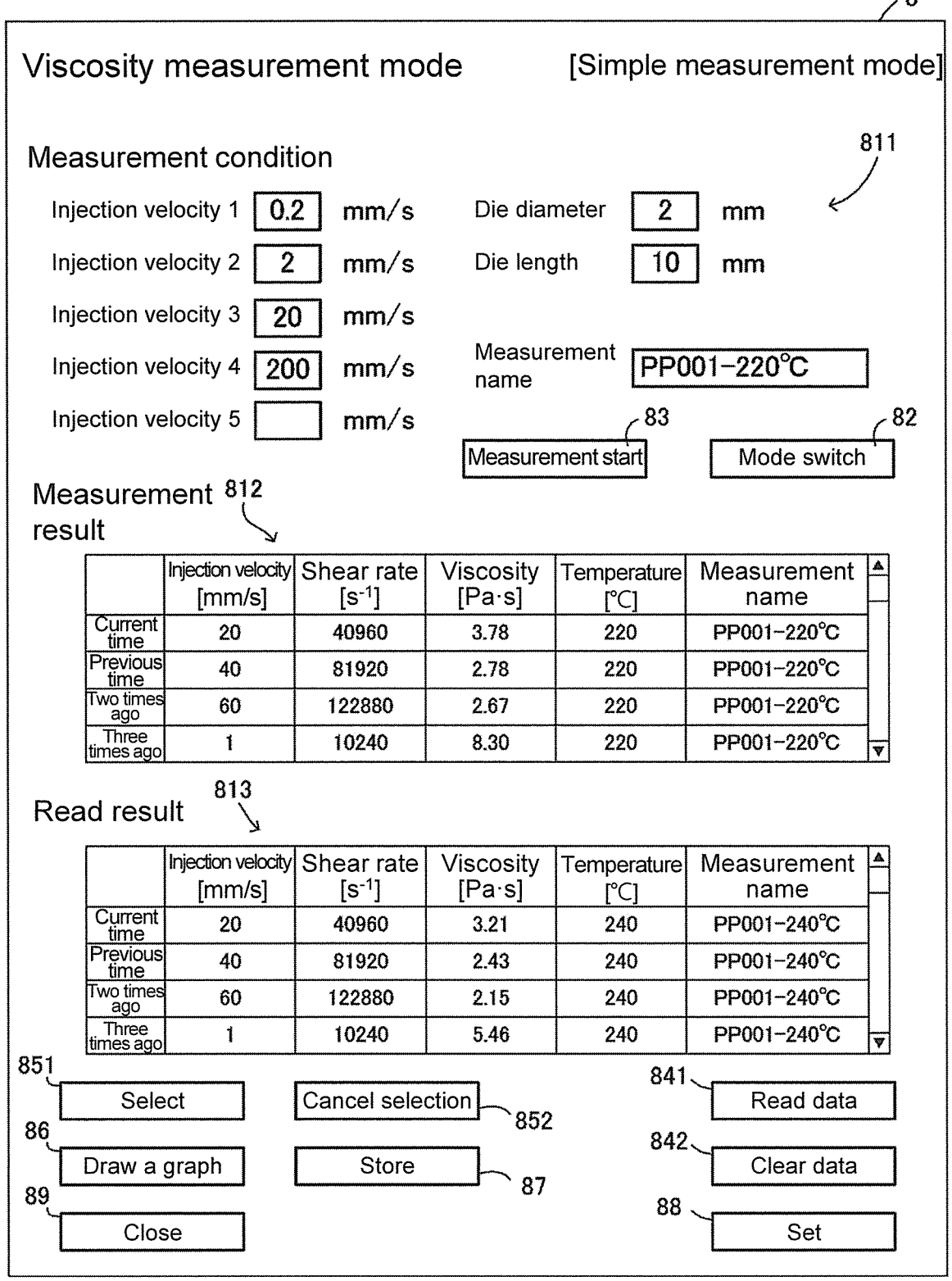
FIG. 10 is a view illustrating an example of an image displayed on a touch panel of the control device 7 in a viscosity measurement mode.

FIG. 10 is a view illustrating an example of an image displayed on the touch panel of the control device 7 in the viscosity measurement mode. A GUI 8 provides a mode switching button 82. FIG. 10 illustrates a state after the screen on the operation panel is transitioned from "molding mode" to "viscosity measurement mode" by pressing the mode switching button 82 displayed on the touch panel of the control device 7. The mode of the injection molding machine 1 may also be automatically switched to the viscosity measurement mode by mechanically or electrically detecting the installation of the viscosity measurement unit 5.

Figure 11:
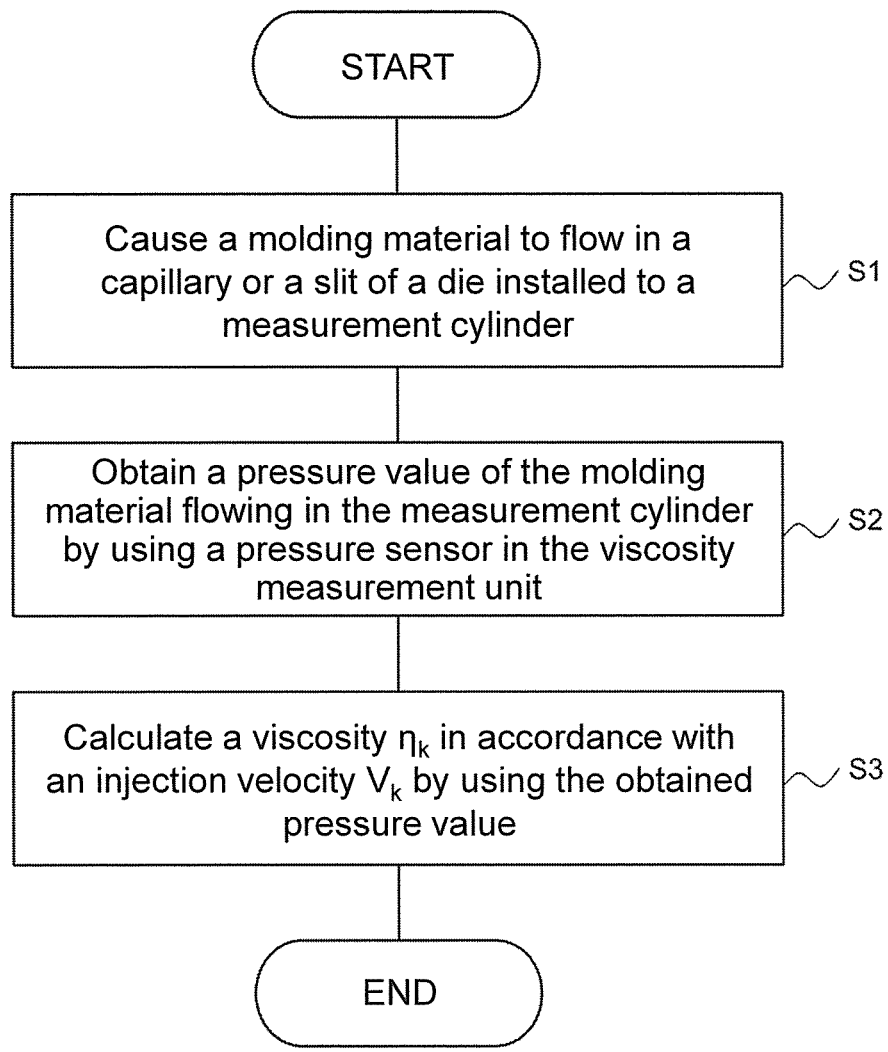
FIG. 11 is a flowchart schematically illustrating an exemplary viscosity measurement method according to an embodiment of the disclosure.

FIG. 11 is a flowchart schematically illustrating an exemplary viscosity measurement method according to an embodiment of the disclosure. The viscosity measurement method according to an embodiment of the disclosure includes a process S1 of causing the molding material to flow to the capillary or the slit of the die installed to the measurement unit 50, a process S2 of obtaining the pressure value of the molding material in the measurement cylinder 50 by using the pressure sensor 61 of the viscosity measurement unit 5, and a process S3 of calculating the viscosity $\eta_k$ in accordance with the injection velocity $V_k$ by using the obtained pressure value.

(Process of Causing the Molding Material to Flow to the Capillary or Slit)

In addition to the mode switching button 82, the GUI 8 includes a measurement condition input form 811. The measurement condition input form 811 has input fields of the inner diameter and the effective length of the capillary of the die installed to the measurement cylinder 50. "die diameter" and "die length" in the measurement condition input form 811 shown in FIG. 10 respectively correspond to the inner diameter and the effective length of the capillary.

The measurement condition input form 811 is also provided with an input field of the injection velocity used for the viscosity measurement. Here, five fields, i.e., "injection velocity 1" to "injection velocity 5", are displayed in the screen. The fields are fields where the operator calculates by hand and inputs the injection velocity candidates.

In the embodiment, the values of the injection velocity $V_k$ calculated by the control device 7 based on the shear rates $\gamma_k$ set in advance are automatically input to the fields of "injection velocity 1" to "injection velocity 5".

The inner diameter of the injection cylinder 41 or the outer diameter of the injection shaft 42 is a known parameter determined by the specification of the injection molding machine 1. The value of D in Formula (1) is known and stored in advance in the storage device 72. When receiving the input of "die diameter" and "die length" into the measurement condition input form 811, the arithmetic device 71 of the control device 7 calls the value of D (here the outer diameter of the plunger) from the storage device 72, calculates $V_k$ for each $\gamma_k$ based on Formula (1), and automatically sets $V_k$ as the injection velocities at the time of the viscosity measurement. The control device 7 displays the values of $V_k$ obtained through calculation in the five fields of "injection velocity 1" to "injection velocity 5" as the injection velocities at the time of viscosity measurement.

However, depending on the value of the parameter used to calculate $V_k$, there may not be an appropriate result. For example, a value out of the specification of the injection driving device 43 may be obtained as the injection velocity $V_k$. In the embodiment, by using the control device 7, the values of Vk within the predetermined range (e.g., within the range of 0.05 mm·sec$^{-1}$ or more and 200 mm·sec$^{-1}$ or less), among the injection velocities $V_k$ that are calculated, are automatically set as the injection velocities at the time of the viscosity measurement. The control device 7 displays the values of $V_k$ within the predetermined range, and does not display the values of $V_k$ out of the predetermined range.

Since five values are prepared in advance as the shear rate $\gamma_k$, there are at most five candidates of the injection velocity that are displayed on the GUI 8. For example, some of the fields of "injection velocity 1" to "injection velocity 5" may be displayed as blank fields without numbers. In the example shown in FIG. 10, 0.2 mm/s, 2 mm/s, 20 mm/s, and 200 mm/s are respectively presented on the GUI 8 as "injection velocity 1" to "injection velocity 4". Meanwhile, the field of "injection velocity 5" is left blank.

It is note that the values of the shear rate $\gamma_k$ may be selected so that at least three injection velocity candidates are displayed on the GUI 8. As an example, the following cases are assumed as the values of d and D to be substituted into Formula (1).

(a) D is within a range of 12 mm or more and 22 mm or less, and d is within a range of 1 mm or more and 3 mm or less;

(b) D is within a range of 23 mm or more and 27 mm or less, and d is within a range of 1 mm or more and 4 mm or less;

(c) D is within a range of 28 mm or more and 32 mm or less, and d is within a range of 1.5 mm or more and 4 mm or less;

(d) D is within a range of 33 mm or more and 39 mm or less, and d is within a range of 1.5 mm or more and 5 mm or less;

(e) D is within a range of 40 mm or more and 60 mm or less, and d is within a range of 2 mm or more and 5 mm or less.

When, for example, five values, i.e., $R*10^1$ sec$^{-1}$, $R*10^2$ sec$^{-1}$, $R*10^3$ sec$^{-1}$, $R*10^4$ sec$^{-1}$, and $R*10^5$ sec$^{-1}$ (R being a number of 1 or more and 5 or less) are adopted as the value of $\gamma_k$ to be substituted into Formula (1), at least three of the five values of $V_k$ that are calculated fall into the range of 0.05 mm·sec$^{-1}$ or more and 200 mm·sec$^{-1}$ or less.

Depending on the values of $\gamma_k$, d, and D substituted into Formula (1), a well-rounded number may not be obtained as $V_k$. In such case, the control device 7 may perform rounding according to the range of the calculated values of Vk. For example, if the calculation result of $V_k$ is less than 1, the calculation result is rounded to the nearest 0.01 if $V_k$ is less than 1, rounded off to the nearest 0.1 if $V_k$ is 1 or more and less than 10, and rounded to the nearest whole if $V_k$ is 10 or more. On such basis it may also be that a value within the predetermined range (in this case, for example, within the range of 0.1 mm·sec$^{-1}$ to 200 mm·sec$^{-1}$) is adopted as $V_k$, and the injection velocity is automatically set as a candidate of the injection velocity during the viscosity measurement. FIG. 10 illustrates an example when the value of R is set to be equal to 5, five values, i.e., $5*10^1$ sec$^{-1}$, $5*10^2$ sec$^{-1}$, $5*10^3$ sec$^{-1}$, $5*10^4$ sec$^{-1}$, and $5*10^5$ sec$^{-1}$ are adopted, and d=2 mm and D=16 mm. However, in FIG. 10, the setting values are input to the fields of "injection velocity 1" to "injection velocity 4" in the order from the smallest value after suitable rounding. When the value of $\gamma_k$ is $5*10^5$ sec$^{-1}$, V is out of the above range. Therefore, the field "injection velocity 5" is left blank.

In this way, the viscosity measurement method according to an embodiment of the disclosure includes a process of, using the control device 7, automatically calculating $V_k$ based on a predetermined Formula, such as Formula (1), and automatically setting the values of $V_k$ within the predetermined range as the injection velocities at the time of the viscosity measurement. For such process, it may also be that an "automatic input button", for example, is provided in the measurement condition input form 811, and such process is executed by the operator by pressing the automatic input button.

The operator selects one of the injection velocity candidates displayed on the GUI 8. For example, with the operator touching one of the injection velocities displayed in the fields of "injection velocity 1" to "injection velocity 5", the value of $V_k$ at the time of controlling the injection driving device 43 is obtained by the arithmetic device 71.

When the operator selects the injection velocity and presses a measurement start button 83 of the GUI 8, the control device 7 transmits a control signal to the injection driving device 43 so that the injection shaft 42 is driven at the selected injection velocity $V_k$. Based on the input data and setting values, the molding material is injected from the viscosity measurement unit 5 and the viscosity measurement of the molding material is executed.

The injection device 4 may have an encoder 44 (see FIG. 9). The encoder 44 is a sensor that reads the position of the plunger as the injection shaft 42 along the axial direction in the injection cylinder 41. By using the position information of the injection shaft 42 read by the encoder 44 and the timing of a timer, for example, the movement velocity (equivalent to the injection velocity) of the injection shaft 42 is calculated. In the calculation of the viscosity using Formula (3) above, the injection velocity $V_k$ as the setting value may be used, and the actual measurement value of the injection velocity calculated based on the output of the encoder 44 may also be used.

(Process S2 of Obtaining the Pressure Value of the Molding Material Flowing in the Measurement Cylinder)

The molding material guided into the flow passage inside the measurement cylinder 50 flows into the capillary die installed to the front cylinder 52 via the measurement cylinder 50 including the front cylinder 52 to which the pressure sensor 61 is installed. The molding material guided into the measurement cylinder 50 passes through the flow passages 511, 521, and 641 (see FIG. 5) in order and reaches the second capillary die 63.

In the process in which the molding material passes through the flow passage 521 of the front cylinder 52, the control device 7 obtains the measurement value of the pressure of the molding material flowing through the flow passage 521 by using the pressure sensor 61. The pressure value measured by using the pressure sensor 61 may vary during the injection of the molding material. For the pressure value used in the calculation of the viscosity, a value at a time point when the measured pressure value is substantially constant may be adopted. The average for a time during a predetermined period after a period from the driving of the injection shaft 42 starts may also be used. This is because in the latter half of injection, the pressure of the molding material is expected to converge within a substantially constant range.

It suffices as long as the installation position of the pressure sensor 61 is at a flow passage upstream of the first capillary die 62 and the second capillary die 63. However, the position of the pressure sensor 61 may be located as close as possible to the first capillary die 62 and the second capillary die 63. The pressure sensor 61 of the embodiment is fixed at the first hole part 525, and measures the pressure of the molding material flowing in the flow passage 521 of the front cylinder 52.

(Process S3 of Calculating the Viscosity $\eta_k$ in Accordance with the Injection Velocity $V_k$)

The arithmetic device 71 of the control device 7 receives the measurement value obtained by the pressure sensor 61 and calculates the viscosity $\eta_k$ in accordance with the value of the currently selected injection velocity $V_k$ based on Formulae (3) and (4). The control device 7 displays the value of the viscosity $\eta_k$ obtained through calculation on the display device 74. In the example shown in FIG. 10, the value of the viscosity $\eta_k$ is displayed in the row of "current time" of a measurement result display table 812 together with the value of the injection velocity $V_k$ and the value of the shear rate $\gamma_k$ used for pressure measurement. The measurement result display table 812 is a portion in the GUI 8, in which the data obtained through the current viscosity measurement and the parameter used for the measurement at this time.

The measurement of the pressure and the calculation of the viscosity may be executed multiple times by changing the setting of the injection velocity. In the exemplary embodiment of the disclosure, the measurement of the pressure and the calculation of the velocity are carried out for each value of $V_k$ in the predetermined range. According to the example of FIG. 10, the control device 7 operates the injection driving device 43 at each of the injection velocities shown in the fields of "injection velocity 1" to "injection velocity 4", and executes the measurement of the pressure and the calculation of the velocity under each injection velocity. At least four measurement results in accordance with the values of $V_k$ can be obtained. The control device 7 displays a list of the values of the injection velocity $V_k$, the shear rate $\gamma_k$, and the viscosity $\eta_k$ in the measurement result display table 812 for each measurement.

In the embodiment, three or more values $\gamma_k$ of the shear rate set in advance are stored in the storage device 72, and, for example, if the inner diameter d of the capillary of the die is input, multiple injection velocities in accordance with the specification of the injection shaft 42 are automatically input. Variations in measurement conditions from one operator to another can be eliminated. The comparison with viscosity measurement results previously obtained by other operators is also facilitated.

For example, the inner diameter d of the capillary of the die and the value of the injection velocity $V_k$ are stored in association in the storage device 72 in the form of a table, and, by referring to the table, it is possible to automatically input the injection velocity $V_k$ in accordance with the value of d. According to the embodiment, with the arithmetic device 71 calculating the injection velocity $V_k$ by receiving the input the inner diameter d of the capillary, even in the case where a capillary with an unprecedented specification is used, a suitable injection velocity can be automatically presented.

If the measurement result of the viscosity $\eta_k$ is obtained, the control device 7 may also draw a graph illustrating the relationship between the value of the viscosity $\eta_k$ and the value $\gamma_k$ of the shear rate. In the example shown in FIG. 10, the GUI 8 includes a selection button 851, a selection cancellation button 852, and a graph drawing button 856. By performing a tap operation with respect to one or more rows of the data displayed on the measurement result display table 812, for example, the rows are temporarily selected, and then, by pressing the selection button 851, the temporarily selected rows are selected. The selection cancellation button 852 is a button for canceling the selection at this time. When the graph drawing button 86 is pressed in the state in which one or more rows in the measurement result display table 812 are selected, the control device 7 may draw the graph indicating the relationship between the value $\gamma_k$ of the shear rate and the value of the viscosity $\eta_k$ based on the data of the selected rows and display the graph on the display device 74. For example the control device 7 detects the pressing of the graph drawing button 86 and presents a double-logarithmic or semi-logarithmic rheological curve (may also be referred to as "flow curve") to the operator.

Figure 12:
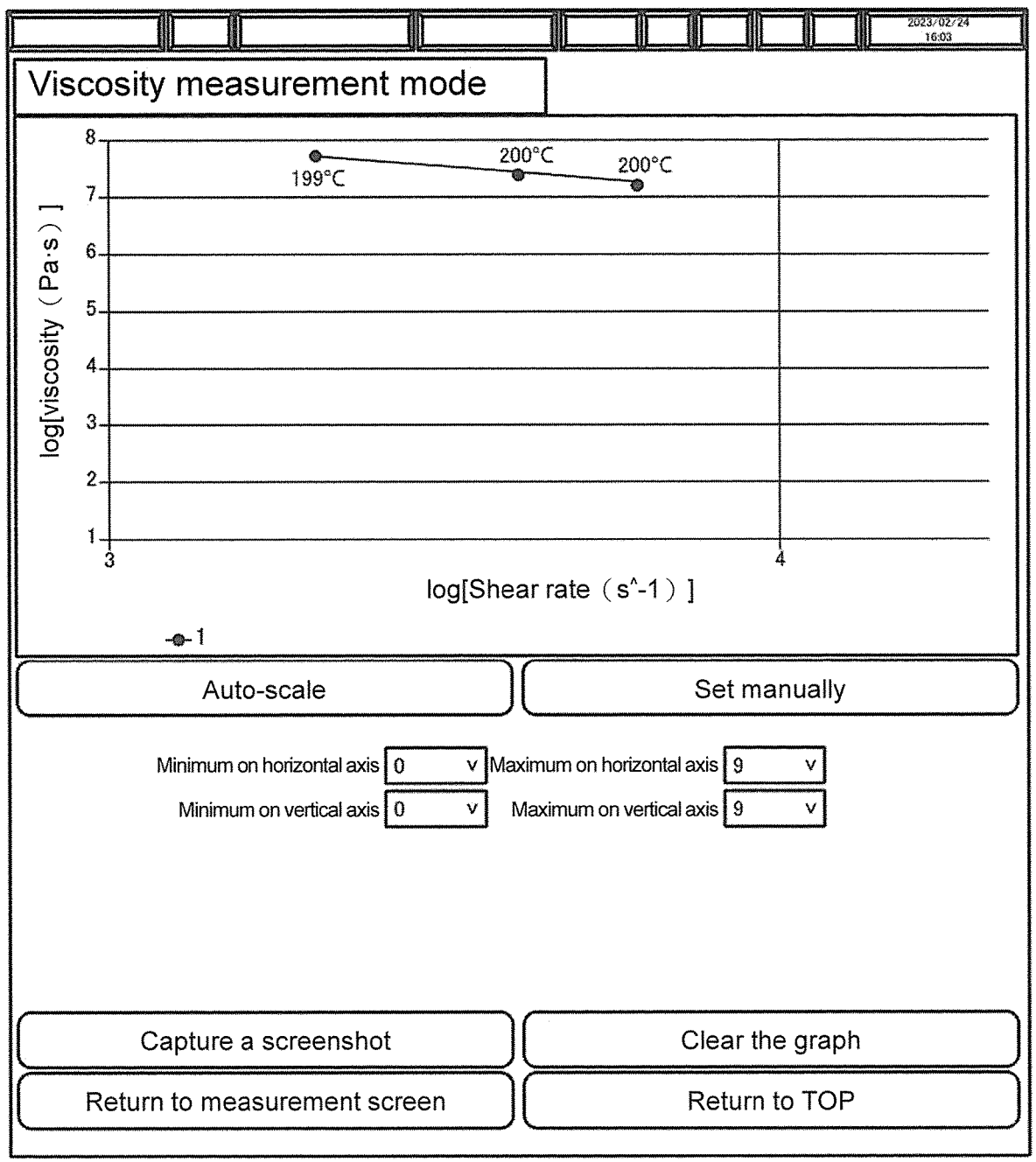
FIG. 12 is a diagram for explaining an example of a graph displayed on a touch panel of an operation panel by pressing a graph drawing button 86.

FIG. 12 illustrates an example of a graph displayed on the touch panel of the operation panel by pressing the graph drawing button 86. FIG. 12 is an example in which the measurement results of the viscosities $\eta_k$ under three different injection velocities $V_k$ in the form of a graph. In the graph shown in FIG. 12, the horizontal axis represents the shear rate $\gamma_k$, and the vertical axis represents the viscosity $\eta_k$. As shown in FIG. 12, in the graph, for each measurement of the viscosity $\eta_k$, an actual measurement value $T_k$ of the temperature of the molding material measured by the temperature sensor 63 may also be presented together. In the graph, the actual measurement value of the temperature of each part measured by at least one of temperature sensors 291, 471, and 681 of the respective parts to be described afterwards may also be displayed together. The actual measurement value of the displayed temperature is a representative value sampled during one viscosity measurement. In the graph, at least one of the temperature setting values for controlling heaters 29, 47, 67, and 68 may be displayed together.

By presenting, as a graph, the measurement result of the viscosity $\eta_k$ in the form in association with the shear rate $\gamma_k$ (or the injection viscosity $V_k$) to the operator, it is possible for the operator to visually and intuitively understand the viscosity properties of the molding material in the molding site. The graph data may also be stored in the auxiliary storage device of the storage device 72 or an external storage medium 75 (see FIG. 9) such as a flash memory, as image data, for example.

As shown in FIG. 12, there may be three or more values of $V_k$ used in the viscosity measurement for each die. In other words, there may be three or more plotted dots. This is because when the shear rate value $\gamma_k$ is plotted on the horizontal axis and the viscosity $\eta_k$ is plotted on the vertical axis, at least linear fitting becomes possible. There may also be four or more plotted points. In such case, curve regression becomes possible.

The setting values of the injection velocity used at the time of the viscosity measurement may be distributed properly. Even for a skilled operator, determining three or more effective injection velocities different from each other is a complicated, labor-intensive and time-consuming task.

According to the embodiment of the disclosure, multiple injection velocities in accordance with the $\gamma_k$ may be set automatically based on three or more values $\gamma_k$ of the shear rate set in advance. It is possible to obtain a graph illustrating the viscosity properties of the molding material irrelevant of the skillfulness of the operator.

The control device 7 may also be configured to be able to draw a graph based on data obtained according to previous viscosity measurements. In addition to the measurement result display table 812, the GUI 8 also includes a read result display table 813 that displays a list of data obtained from past viscosity measurements for each injection velocity. The GUI 8 further includes a data reading button 841. When detecting the pressing of the data reading button 841, the control device 7 refers to the data stored in the auxiliary storage device of the storage device 72 or the external storage medium 75 and present the data in the read result display table 813.

The operator can select data in the read result display table 813 in the same manner as selecting data in the measurement result display table 812. In selecting data from the measurement result display table 812 and the read result display table 813, it may also be that the step of temporary selection is set as a step of selection, and the step of the selection button 851 is omitted. In such case, the selection button 851 may also be omitted from the GUI 8.

When it is detected that the graph drawing button 86 is pressed by the operator in a state in which multiple rows of the read result display table 813 are selected, the control device 7 presents the results of past viscosity measurements in the form of a graph on the display device 74 based on the data of the selected rows. In addition to the data included in the read result display table 813, the data included in the measurement result display table 812 may also be selected, and multiple graphs related to the measurement results may be superimposed and displayed in one screen.

Figure 13:
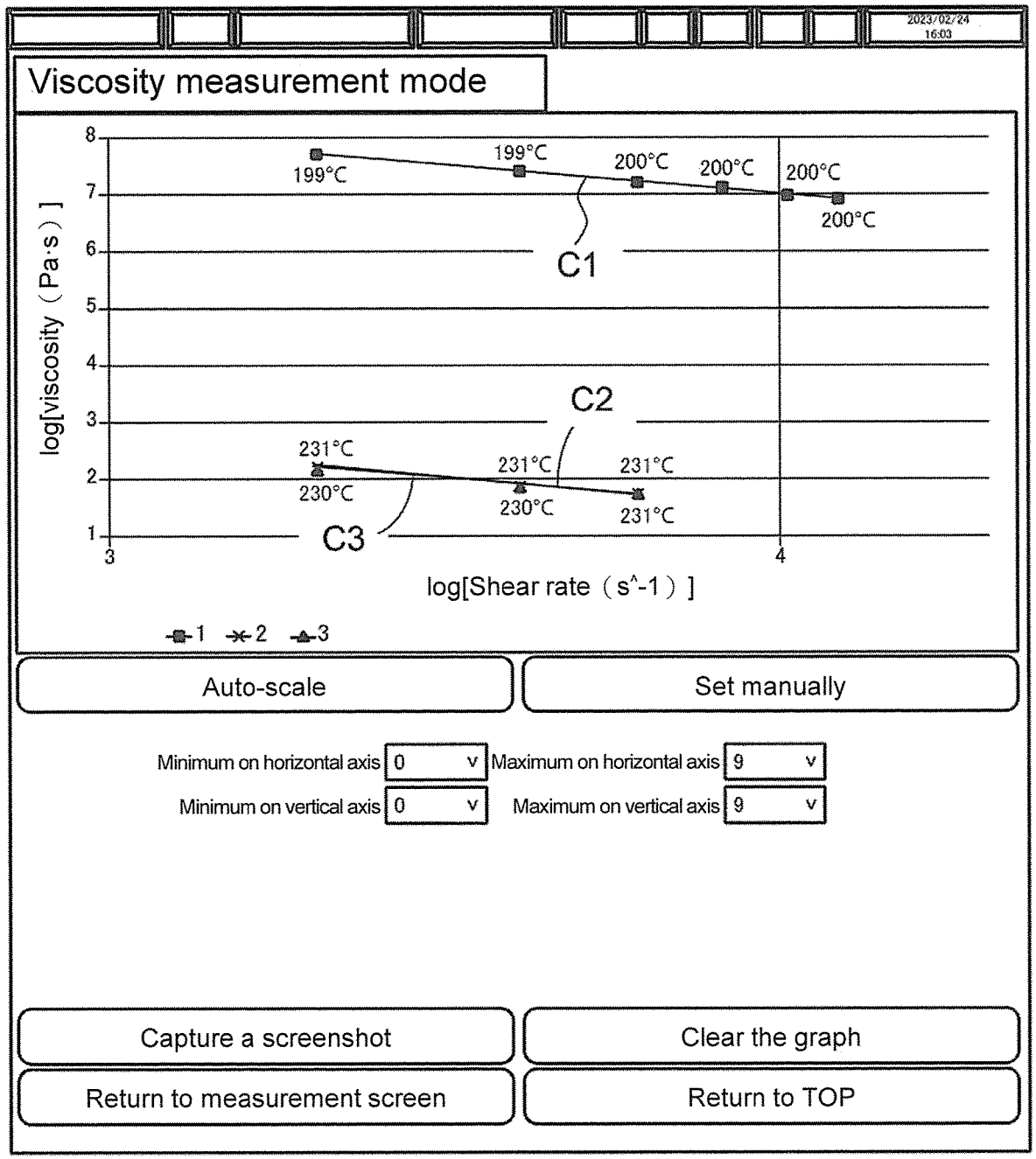
FIG. 13 is a view illustrating an example displayed in the form in which a graph illustrating a latest measurement result and a graph illustrating a previous measurement result are superimposed.

FIG. 13 illustrates an example in which a graph illustrating the latest measurement results and a graph illustrating the past measurement results are presented in a superimposed form. Data obtained by measurements under different heater temperatures, for example, even though the injection velocity is the same are displayed on the screen as graphs C1 to C3. According to the embodiment, among the data of different conditions at the time of measurement, it is easy to compare the viscosity between data of different measurement dates, for example, and it is possible to visually understand different behaviors of the molding material due to different lots of the molding material, for example.

(Switching of Discharge Destinations of the Molding Material)

In the embodiment, by rotating the flow passage switching pin 64 in the flow passage switching pin installation hole 522 around the axis of the measurement cylinder 50 to change the orientation of the outlet of the flow passage 641, it is possible to switch the discharge destination of the molding material among multiple dies. For example, in the case of Bagley correction, in calculating the viscosity, it is necessary to measure the pressure twice and switch the die. According to the embodiment of the disclosure, it is easy to perform Bagley correction on the injection molding machine 1 without having to prepare multiple machines for viscosity measurement.

The Bagley correction is a type of correction for determining the true shear stress τ in consideration of the pressure losses occurring at the inlet and the outlet of the capillary of the die. In the case where the viscosity of the molding material is to be measured more accurately, Bagley correction may be carried out. The control device 7 may also be configured to transition the screen from "simple measurement mode" shown in FIG. 10 to "Bagley correction mode" shown in FIG. 14 by pressing the mode switching button 82 provided in the GUI 8. For "measurement mode" of the injection molding machine 1, there may be two or more modes. The "measurement mode" of the injection molding machine 1 may further include a mode for carrying out Rabinovich correction to be described in the following.

Figure 14:
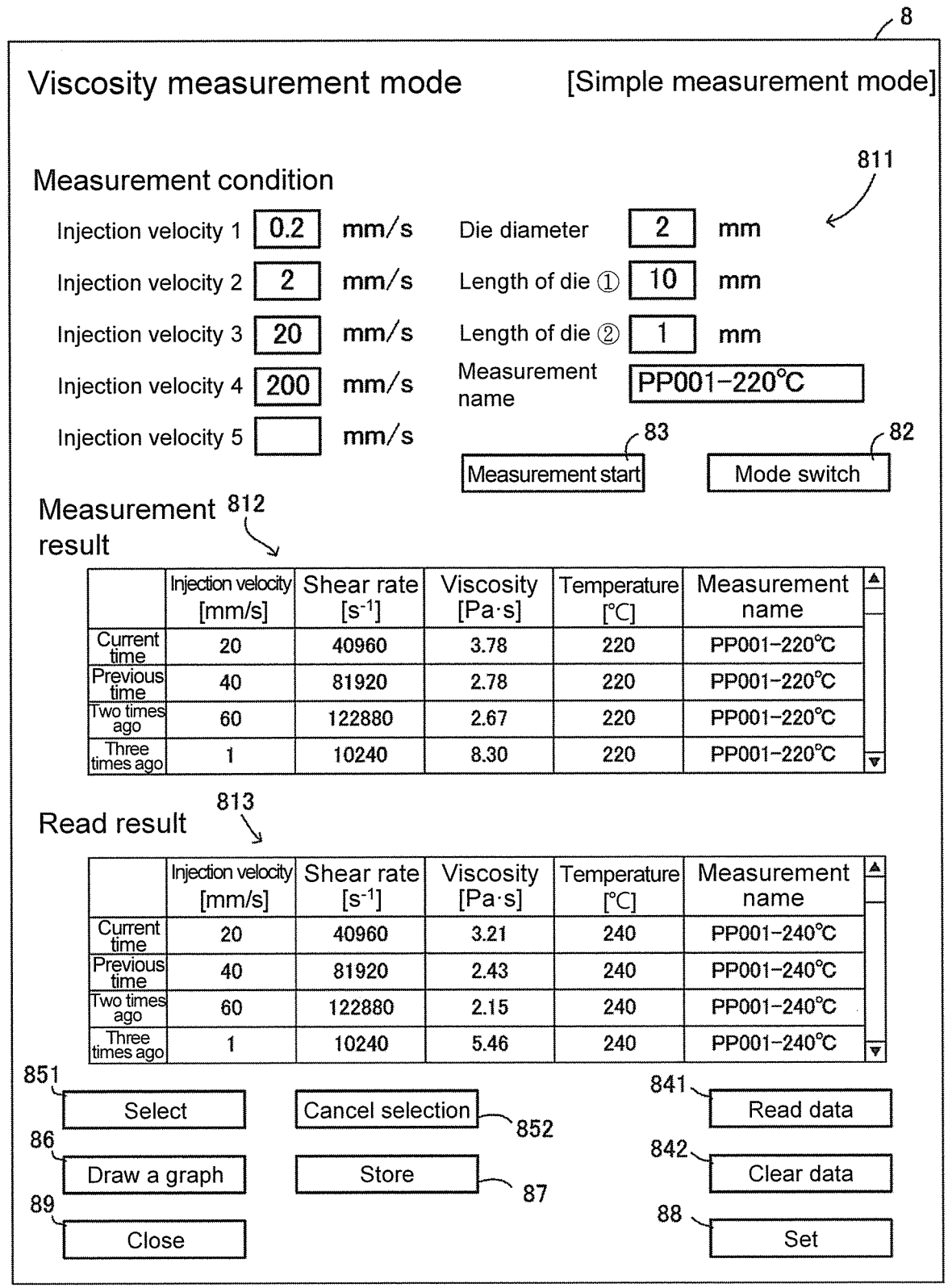
FIG. 14 is a view illustrating an example of an image displayed on the touch panel of the control device 7 in a Bagley correction mode.

The measurement condition input form 811 of "Bagley correction mode" shown in FIG. 14 has two input fields of "die length". For example, in the case where the first capillary die 62 and the second capillary die 63 are installed to the measurement cylinder 50, an effective length $L_1$ of the first capillary 621 and an effective length $L_2$ of the second capillary 631 are input to the two input fields of "die length".

When the molding material passes through the capillary, in general, a pressure loss occurs at the inlet, the inside, and the outlet of the capillary. By subtracting an estimated pressure $P_0$ when the effective length of the capillary is 0 mm from a pressure value P of the molding material when using a capillary die, a pressure value $(P-P_0)$ when it is assumed that a pressure loss does not occur in the capillary inlet and the capillary outlet can be estimated. The true shear stress τ in consideration of Bagley correction is expressed by Formula (6) as follows.

[Formula (6)]

$$\tau = \frac{(P-P_0)d}{4L} \quad (6)$$

If the pressure value of the molding material when the first capillary die 62 is used is $P_1$, and the pressure value of the molding material when the second capillary die 63 is used is $P_2$, the estimated pressure $P_0$ relating to the first capillary die 62 can be obtained by using Formula (7) as follows.

[Formula (7)]

$$P_0 = \frac{P_2 L_1 - P_1 L_2}{L_1 - L_2} \quad (7)$$

In the case of Bagley correction, it is necessary to switch the die to perform at least two times of pressure measurement.

According to the embodiment of the disclosure, the discharge destination of the molding material can be easily switched between the first capillary die 62 and the second capillary die 63. After the positioning rod 66 is removed from the second hole part 526 and the flow passage switching pin 64 is rotated by an appropriate angle, the positioning rod 66 is inserted from the other second hole part 526 to insert the tip of the positioning rod 66 into the concave part 643 of the flow passage switching pin 64. Accordingly, the discharge destination of the molding material can be switched from the second capillary die 63 to the first capillary die 62.

The discharge destination of the molding material is set to be the second capillary die 63 to obtain a pressure value $P_2$ of the molding material. Once the retrieval of the pressure value $P_2$ is completed, for example, the control device 7 causes the touch panel of the operation panel to display a message prompting die switching. The operator switches the orientation of the flow passage switching pin 64 to switch the discharge destination of the molding material to the other die (here, the first capillary die 62). The control device 7 receives that the die switching is completed through an input from the operator, for example, and carries out pressure measurement on the molding material by using the first capillary die 62 under the injection velocity $V_k$ substantially the same as before.

By switching the discharge destination of the molding material to the first capillary die 62 and causing the molding material to flow in the first capillary 621 of the first capillary die 62, the pressure value $P_1$ of the molding material can be obtained by using the pressure sensor 61. In this way, the process of obtaining the pressure value of the molding material may also include a process of switching among two or more dies, each of which is a destination for introducing the molding material via the measurement cylinder 50, and obtaining the pressure values individually. In the case where the inner diameter $d_2$ of the second capillary 631 and the inner diameter $d_1$ of the first capillary 621 are different, a suitable injection velocity $V_k$ is set automatically for each capillary.

The switching of the dies is not limited to switching between two capillary dies of different specifications. The viscosity measurement unit 5 may also be configured to be able to switch the discharge destination of the molding material, for example, between the capillary die and a slit die having a slit in a rectangular cross-sectional shape. Alternatively, the viscosity measurement unit 5 may also be configured to be able to switch the discharge destination of the molding material between multiple slit dies.

In the embodiment, a female screw part is formed on the inner wall of the die installation hole 524 of the front cylinder 52. It is also easy to install to the front cylinder 52 a slit die that has a male screw part in a shape corresponding to the female screw part of the die installation hole 524, the male screw part being provided on the outer peripheral surface of the slit die.

In the case where a slit die is used in place of the capillary die to measure the viscosity, the apparent shear stress $\tau_{ap}$ can be calculated from Formula (8) as follows in place of Formula (4), if the effective length of the slit is set as L (in the unit of mm). In Formula (8) as follows, $P_s$ represents the pressure value (in the unit of Pa) of the molding material when the slit die is used. Also, in Formula (8) as follows, H represents a slit length (in the unit of mm), and B represents a slit width (in the unit of mm). "slit length" and "slit width" in the specification respectively correspond to "slit gap" and "slit width" in JIS K 7199:199.

[Formula (8)]

$$\tau_{ap} = \frac{P_s HB}{2L(H+B)} \quad (8)$$

As a formula representing the apparent shear rate $\gamma_{ap}$, Formula (9) as follows may be used in place of Formula (5) above.

[Formula (9)]

$$\gamma_{ap} = \frac{3\pi D^2}{2BH^2} V \quad (9)$$

If the shear rate $\gamma_k$ set in advance is used as the apparent shear rate $\gamma_{ap}$ in Formula (9) above, Formula (2) as follows is eventually obtained.

[Formula (2)]

$$V_k = \frac{2BH^2}{3\pi D^2} \gamma_k \quad (2)$$

Like the case where the capillary die is applied, the control device 7 automatically sets the values of Vk in the predetermined range, among the injection velocities $V_k$ calculated based on Formula (2) above by using the shear rates $\gamma_k$, as the injection velocities at the time of viscosity measurement. In addition, by operating the injection driving device 43 under the injection velocities selected from the values of $V_k$ and obtaining the measurement values from pressure sensor 61, the control device 7 may calculate the viscosities $\eta_k$ in accordance with $V_k$.

In the case where two slit dies of different specifications are used to perform Bagley correction, it suffices as long as the true shear stress τ be obtained by applying Formula (10) below in place of Formula (6) above. To obtain the estimated pressure $P_0$ in Formula (10), it suffices as long as $P_1$ and $P_2$ in Formula (7) above are replaced by the pressure value of the molding material when the first slit die is used and the pressure value of the molding material when the second slit die is used, and $L_1$ and $L_2$ (assuming $L_2 < L_1$) are replaced by the effective length of the slit of the first slit die and the effective length of the slit of the second slit die, respectively.

[Formula (10)]

$$\tau = \frac{(P_s - P_0) HB}{2L(H+B)} \quad (10)$$

In the case where multiple dies are switched and used, even at the same injection velocity $V_k$, the magnitudes of the actual shear rates may change in accordance with different capillaries or geometric shapes of the slits. In the case where the measurement results of the viscosity are presented to the operator as a graph, it is convenient to make the values $\gamma_k$ of the shear rate used for calculating the injection velocity $V_k$ the same among multiple dies to facilitate the comparison of measurement results.

The control device 7 may also be configured to perform Rabinovich correction in addition to or in place of Bagley correction through the selection by the operator, for example. By performing at least one or both of Bagley correction and Rabinovich correction, a more accurate viscosity measurement can be performed.

The apparent shear rate $\gamma_{ap}$ is the value of the shear rate in the case where the molding material is a Newtonian fluid, that is, when a structural viscosity index n of the molding material as the measurement target is 1. However, the actual molding material is generally a non-Newtonian fluid. Therefore, a deviation may occur between the true shear rate γ and the apparent shear rate $\gamma_{ap}$. The Rabinovich correction is a correction to obtain the real shear rate γ by multiplying the apparent shear rate $\gamma_{ap}$ with a predetermined coefficient determined in accordance with the structural viscosity index n.

The true shear rate γ obtained through Rabinovich correction in the case where a capillary die is used is represented in Formula (11) below. The true shear rate γ obtained through Rabinovich correction if a slit die is used is represented in Formula (12) below.

[Formula (11)]

$$\gamma = \frac{8D^2 V}{d^3} \cdot \frac{3n+1}{4n} \quad (11)$$

[Formula (12)]

$$\gamma = \frac{3\pi D^2 V}{2BH^2} \cdot \frac{2n+1}{3n} \quad (12)$$

Here, the structural viscosity index n is obtained by using Formula (13) below.

[Formula (13)]

$$n = \frac{d \log_{10} \tau}{d \log_{10} \gamma_{ap}} \quad (13)$$

Through Bagley correction and Rabinovich correction, the true shear stress τ and the true shear rate γ are obtained. At this time, the true viscosity is obtained as a value obtained by dividing τ by using γ (τ/γ). Rabinovich correction may always be carried out, or whether Rabinovich correction is carried out may be arbitrarily switchable by the operator. In the case where only Rabinovich correction is carried out without Bagley correction, it suffices as long as the apparent shear stress $\tau_{ap}$ is used in calculation in place of the true shear rate τ. In the case where at least one of Bagley correction and Rabinovich correction is carried out, the corrected value of the viscosity $\eta_k$ is displayed on the vertical axis of the viscosity property graph, the measurement result display table 812, and the read result display table 813. In the case where Rabinovich correction is carried out, the corrected shear rate $\gamma_k$ is displayed on the horizontal axis of the viscosity property graph, the measurement result display table 812, and the read result display table 813.

In the above example, the flow passage switching pin 64 is manually rotatable by using a tool. However, the disclosure is not limited to the example. The flow passage switching pin 64 may also be automatically rotatable by using various driving devices, such as a hydraulic cylinder, a pneumatic cylinder, or an electric motor. The switching of dies through the rotation of the flow passage switching pin 64 may also be controlled by the control device 7.

During Bergley correction, multiple dies having different specifications other than the effective length may be used.

Even if Bagley correction is not performed, the viscosity measurement may also be performed by switching among multiple dies of different specifications.

When the die installation hole 524 of the viscosity measurement unit 5 is provided to face substantially downward, it is easy to recollect the molding material discharged from the die. As can be understood from FIG. 6, when viewed in a front perspective, the angle formed between a line parallel to the central axis of the die installation hole 524 and a vertical line passing through the center of the front cylinder 52 may be substantially less than or equal to 40°. The vertical line passing through the center of the front cylinder 52 is a line parallel to the direction of gravity.

A bolt, etc., may also be applied as the fastener 53 in place of the cover screw 531.

4. Others

In the following, other portions of the configuration example of the injection molding machine 1 are described in brief.

During injection molding and viscosity measurement, the control device 7 controls the operations of the plasticizing screw driving device 27, the backflow prevention device 25, and the injection driving device 43 of the injection unit 10 to melt, weigh, and inject the molding material.

By controlling the heaters 29, 47, 48, 67, and 68, the control device 7 heats the plasticizing cylinder 21, the injection cylinder 41, the nozzle cylinder 45, the injection nozzle 46, and the viscosity measurement unit 5 to a desired temperature. At the time of the molding mode, the heaters 67, 68 of the viscosity measurement unit 5 are not used. At the time of the viscosity measurement mode, the heater 48 of the injection nozzle is not used. The injection unit 10 may also have the temperature sensor 291 measuring the temperature of the plasticizing cylinder 21, the temperature sensor 471 measuring the temperature of the injection cylinder 41 and the nozzle cylinder 45, a temperature sensor 481 measuring the temperature of the injection nozzle 46, the temperature sensor 671 measuring the temperature of the rear cylinder 51 of the viscosity measurement unit 5, and the temperature sensor 681 measuring the temperature of the front cylinder 52 of the viscosity measurement unit 5. For the temperature sensors 291, 471, 481, 671, and 681, various types of sensors able to measure temperatures can be adopted. For example, the temperature sensors 291, 471, 481, 671, and 681 are thermocouples, etc. The respective temperature sensors 291, 471, 481, 671, and 681 are connected with the control device 7. Based on the measurement values obtained from the respective temperature sensors 291, 471, 481, 671, and 681, the control device 7 may also perform feedback control on the heaters 29 47, 48, 67, and 68 corresponding to the respective temperature sensors 291, 471, 481, 671, and 681. The control device 7 may also perform feedback control on the heaters 67, 68 based on the measurement values obtained from the temperature sensor 69 in place of the temperature sensors 671, 681.

The mold clamping unit 8 is configured to be able to open, close, and clamp the mounted mold. The mold clamping unit 8 may close the mold before the molding material is injected into the mold, apply a predetermined clamping force, and, after the molding material is cured in the mold, open the mold and discharge the molded article. A conventional configuration, such as a direct pressure type or a toggle type can be adopted for the mold clamping unit 8.

The injection unit 10 plasticizes polymer particles and weighs a predetermined amount, and then injects the molding material from the injection nozzle 46 or the viscosity measurement unit 5. The polymer particles are put into the plasticizing cylinder 21 from the hopper 211. "Molding material" is not limited to polymer particles, but includes various materials able to be injected by the injection molding machine. In addition to a resin material, "molding material" may also include an MIM material in which a binder resin is added to metal powder, a CIM material in which resin as a binder is added to ceramic powder. The molding material may be thermoplastic or thermosetting. The thermoplastic molding material, for example, may be an LIM that is a thermosetting liquid material.

The plasticizing cylinder 21 is heated to a predetermined temperature by using the heater 29, such as a band heater. The molding material supplied into the plasticizing cylinder 21 is melted by the heat from the heater 29 and the shear heat through rotation of the plasticizing screw 23 and delivered to the front of the plasticizing cylinder 21 through the rotation of the plasticizing screw 23.

The plasticizing screw driving device 27 rotates the plasticizing screw 23. The plasticizing screw driving device 27, for example, can adopt various driving means, such as a hydraulic motor or an electric motor. The backflow prevention device 25 prevents the molding material from flowing back into the plasticizing cylinder 21 at the time of injection by moving the plasticizing screw 23 forward and blocking the flow passage using the tip of the plasticizing screw 23. The backflow prevention device 25, for example, can adopt various driving means, such as a hydraulic cylinder, a pneumatic cylinder, an electric cylinder, or an electric motor. As the backflow prevention mechanism, a check valve, a rotary valve, or the like provided in the middle of the flow path may be used in place of the backflow prevention device 25.

The molding material delivered from the plasticizing device 2 is introduced into the injection cylinder 41 of the injection device 4 via the nozzle cylinder 45 and the junction 3 connecting the plasticizing device 2 and the injection device 4. Inside the junction 3, a supply passage that delivers the molding material to the nozzle cylinder 45 from the plasticizing cylinder 21 is formed. The junction 3 may also be heated to a predetermined temperature by using the heater.

The molding material delivered into the injection cylinder 41 is weighed to a desired amount by retracting the injection shaft 42 while being temporarily stored at the front of the injection shaft 42.

After weighing of the molding material, the plasticizing screw 23 is moved forward by using the backflow prevention device 25, and the tip of the plasticizing screw 23 blocks the flow passage combining the plasticizing cylinder 21 and the junction 3. After the molding material is prevented from flowing back, the injection shaft 42 moves forward, and the molding material is delivered to the injection nozzle 46 via the nozzle cylinder 45. In this way, the molding material is injected from the injection nozzle 46.

In the viscosity measurement mode, the molding material is melted, weighed, and injected, like the time when the molding mode is selected, in the state in which the viscosity measurement unit 5 is mounted to the injection unit 10 in place of the injection nozzle 46. In the embodiment, the weighing value at the time of the viscosity measurement is set to the maximum that can be weighed by the injection unit 10. The setting value of the weighing may also be determined as appropriate within a range in which a stable measurement can be performed, without being limited to the maximum that can be weighed.

The molding material pressed by using the injection shaft 42 passes through the nozzle cylinder 45 and is discharged from one of the dies through, in order, the flow passages 511, 521, 641, and 523 inside the viscosity measurement unit 5. At this time, the pressure of the molding material flowing through the flow passage 521 is measured by using the pressure sensor 61.

In the following, supplementary descriptions are made with regard to the GUI 8 shown in FIGS. 10 and 14. In the following, the temperature data that are displayed or stored, for example, are a portion of the entirety of the temperature setting values for controlling the heaters 29, 47, 67, and 68, the actual temperature measurement values of the respective parts measured by the temperature sensors 291, 471, 481, 671, 681 provided in the respective parts, and the actual measurement values $T_k$ of the temperature of the molding material measured by the temperature sensor 69. The actual measurement values that are displayed or stored are representative values sampled in one viscosity measurement, for example.

The GUI 8 of the viscosity measurement mode includes the measurement condition input form 811, the measurement result display table 812, and the read result display table 813. The GUI 8 may also have a display field that displays a portion or the entirety of the actual measurement values of the temperatures of the respective parts and the actual measurement values $T_k$ of the temperature of the molding material.

The measurement condition input form 811 has input fields of the data required for viscosity calculation and the setting value relating to viscosity measurement. In the above example, the operator inputs the specification of the die (e.g., the inner diameter and the effective length of the capillary in the case of a capillary die), any arbitrarily settable measurement name, etc., via the touch panel serving as the input device 73. In the embodiment, multiple $V_k$ corresponding to multiple shear rates $\gamma_k$ set in advance are automatically input to the fields of injection velocity. In an embodiment, the control device 7 performs multiple times of viscosity measurement by changing the injection velocity in the order of $V_1, V_2, V_3, \ldots$ . In addition to the mode in which $V_k$ corresponding to the shear rate $\gamma_k$ is set automatically, a mode in which the operator can manually input an arbitrary value as the injection velocity may also be additionally prepared.

The read result display table 813 is a portion in which the data obtained through past viscosity measurements are displayed as a list for each injection velocity. The operator can compare the data displayed in the measurement result display table 812 and the data displayed in the read result display table 813. The comparison of these data makes it easy to understand the properties of the molding material.

The data displayed in the measurement result display table 812 and the read result display table 813, for example, include the data of injection velocity, shear rate, molding material pressure measurement value, viscosity, temperature, measurement name. For example, regarding the data of injection velocity and temperature, it may be that one of the setting value and the actual measurement value is displayed, and it may also be that both the setting value and the actual measurement value are displayed. In the case where the actual measurement value is expected to be substantially the same as the setting value, the display of the actual measurement value may also be omitted.

The data displayed in the measurement result display table 812 and the read result display table 813 may also be a portion of data relating to the measurement results. The items of the data displayed in the measurement result display table 812 and the read result display table 813 may be arbitrarily selectable by using the operator.

The GUI 8 includes a data clear button 842, a storage button 87, a setting button 88, and a close button 89. The data clear button 842 is a button that instructs the arithmetic device 71 to reset the data displayed in the measurement result display table 812 and the read result display table 813.

When the storage button 87 is pressed, the data relating to the measurement result is stored in an arbitrary form, such as the CVS form, in the auxiliary storage device of the storage device 72 or the external storage medium 75 of a flash memory, etc. The data output and stored include data of die specification, injection velocity, shear rate, pressure measurement value, viscosity, temperature, and measurement name for each measurement. For example, regarding the data of injection velocity and temperature, it may be that one of the setting value and the actual measurement value is stored, and it may also be that both the setting value and the measurement value are stored. In the case where the actual measurement value is expected to be substantially the same as the setting value, the storage of the actual measurement value may also be omitted. In the case where a corrections, such as Bagley correction and Rabinovich correction, is carried out, the viscosity data after correction or the viscosity data both before and after correction may be stored. In the case where a correction such as Rabinovich correction is carried out, the shear rate data after correction or both the shear rate data before and after correction may be stored.

The setting button 88 is a button for calling a predetermined setting screen. In the embodiment, regarding conditions that do not need to change for every viscosity measurement, such conditions are set in a screen different from the screen including the measurement condition input form 811 as shown in FIG. 10. For example, the diameter of the plunger as the injection shaft 42, the shear rate $\gamma_k$, the range of the injection velocity $V_k$, the temperature raising wait time, etc., are input from the screen displayed through pressing the setting button 88. Regarding the parameter, such as a diameter of the plunger, determined by the specification of the injection molding machine 1, if such parameter is automatically input by referring to data relating to the model of the injection molding machine 1, the input field of such parameter may be omitted.

The close button 89 is a button for transitioning the screen from the GUI 8 for viscosity measurement to a GUI for the molding mode.

In the embodiment, the heater temperature of each part of the injection molding machine 1 is set from the GUI for the molding mode. The input field relating to the heater temperature may also be provided in the measurement condition input form 811. Regarding the set temperatures of the heaters 29, 47, 67, 68, usually, the same temperature is input. When measuring viscosity, it is desirable that the temperature of each part through which the molding material flows is stable. After the GUI for the molding mode is transitioned to the GUI 8 for viscosity measurement, a limitation set may be set, so that viscosity measurement cannot be started until the set temperature rise waiting time has elapsed, and the temperature stability may be secured.

The disclosure is not limited to the configuration of the embodiments shown in the drawings, as some examples have already been specifically shown. For example, it is also applicable to other types of injection molding machines such as in-line screw type injection molding machines. The in-line screw injection molding machine has an injection cylinder and an in-line screw serving as the injection shaft 42 disposed inside the injection cylinder. The in-line screw has both the function of the plasticizing screw 23 in the injection molding machine 1 and the function of a plunger as the injection shaft 42. However, compared with the in-line screw type injection molding machine, a screw preplasticating injection molding machine has superior stability in weighing and injection of the molding material, and can be expected to measure the viscosity of the molding material more accurately.

The embodiments are chosen to illustrate the principles of the disclosure and its practical application. Various improvements are possible with reference to the above description. The scope of the disclosure is defined by the claims appended hereto.

What is claimed is:

1. An injection molding machine, comprising:
an injection cylinder, to which a viscosity measurement unit is attachable and detachable;
an injection shaft, inside the injection cylinder;
an injection driving device, driving the injection shaft; and
a control device, controlling the injection driving device, so as to drive the injection shaft forward and rearward,
wherein, when setting an inner diameter of the injection cylinder or an outer diameter of the injection shaft as D, and, for a capillary die and/or a slit die installed to the viscosity measurement unit, a capillary inner diameter is set as d and a slit length and a slit width are respectively set as B and H, the control device is configured to, by respectively using three or more values $\gamma_k$ of shear rate, k being a natural number, calculate injection velocities $V_k$ based on Formula (1) or (2) below and automatically set a value of the injection velocity $V_k$ within a predetermined range, among the calculated injection velocities, as an injection velocity at a time of viscosity measurement

[Formula (1)]
$$V_k = \frac{d^3}{8D^2}\gamma_k \quad (1)$$

[Formula (2)]
$$V_k = \frac{2BH^2}{3\pi D^2}\gamma_k. \quad (2)$$

2. The injection molding machine as claimed in claim 1, wherein the viscosity measurement unit comprises:
the capillary die and/or the slit die;
a measurement cylinder, to which the capillary die and/or the slit die is installed; and
a pressure sensor, measuring a pressure of a molding material flowing in the measurement cylinder.

3. The injection molding machine as claimed in claim 2, wherein the viscosity measurement unit is configured so that two or more dies of different specifications are able to be installed to the viscosity measurement unit.

4. The injection molding machine as claimed in claim 2, wherein, the control device is configured to, for each value of the injection velocity $V_k$ within the predetermined range, calculate a viscosity $\eta_k$ of the molding material in accordance with the value of the injection velocity $V_k$ by using a measurement value obtained from the pressure sensor by operating the injection driving device.

5. The injection molding machine as claimed in claim 4, further comprising a display device, wherein the control device is configured to display the value of the injection velocity $V_k$ within the predetermined range and a value of the viscosity $\eta_k$ on the display device.

6. The injection molding machine as claimed in claim 5, wherein the viscosity measurement unit comprises a temperature sensor measuring a temperature of the molding material flowing in the measurement cylinder,
the control device, for each value of the injection velocity $V_k$ in the predetermined range, obtains an actual measurement value $T_k$ of the temperature of the molding material obtained from the temperature sensor by operating the injection driving device, and
the control device further displays the actual measurement value $T_k$ of the temperature of the molding material on the display device.

7. The injection molding machine as claimed in claim 5, wherein the control device is configured to draw and display, on the display device, a graph illustrating a relationship between a value $\gamma_k$ of the shear rate and the value of the viscosity $\eta_k$.

8. The injection molding machine as claimed in claim 7, wherein the viscosity measurement unit comprises a temperature sensor measuring a temperature of the molding material flowing in the measurement cylinder,
the control device, for each value of the injection velocity $V_k$ in the predetermined range, obtains an actual measurement value $T_k$ of the temperature of the molding material obtained from the temperature sensor by operating the injection driving device, and
the control device further displays the actual measurement value $T_k$ of the temperature of the molding material on the display device.

9. The injection molding machine as claimed in claim 5, wherein the control device is configured to draw and display, on the display device, a graph illustrating a relationship between a value obtained by correcting the value $\gamma_k$ of the shear rate with Rabinovich correction and a value obtained by correcting the viscosity $\eta_k$ with Rabinovich correction.

10. The injection molding machine as claimed in claim 5, wherein the three of more values $\gamma_k$ of of the shear rate are values selected within a range of 1*101 sec-1 or more and 5*105 sec-1 or less, where * represents multiplication, and the predetermined range of the injection velocity is 0.05 mm·sec$^{-1}$ or more and 200 mm·sec$^{-1}$ or less.

11. The injection molding machine as claimed in claim 10, wherein the three or more values $\gamma_k$ of of the shear rate are five values, which are $R*10^1$ sec$^{-1}$, $R*10^2$ sec$^{-1}$, $R*10^3$ sec$^{-1}$, $R*10^4$ sec$^{-1}$, and $R*10^5$ sec$^{-1}$, R being a number of 1 or more and 5 or less.

12. A viscosity measurement method, provided for the injection molding machine as claimed in claim 2, the viscosity measurement method comprising:
a process of causing the molding material to flow in the capillary die or the slit die installed to the measurement cylinder via the measurement cylinder of the viscosity measurement unit having the pressure sensor from the injection cylinder at the injection velocity $V_k$;
a process of acquiring a pressure value of the molding material flowing in the measurement cylinder by using the pressure sensor; and
a process of calculating a viscosity $\eta_k$ in accordance with the injection velocity $V_k$ by using the pressure value,
wherein the process of causing the molding material to flow comprises a process of, by using the control device of the injection molding machine, calculating the injection velocity $V_k$ in accordance with each of the three or more values $\gamma_k$ of the shear rate set in advance based on Formula (1) or (2), and automatically setting the value of the injection velocity $V_k$ in the predetermined range, among the calculated injection velocities, as the injection velocity at the time of viscosity measurement.

13. The viscosity measurement method as claimed in claim 12, wherein in the process of automatically setting the injection velocity $V_k$, the three or more values $\gamma_k$ of of the shear rate are values selected within a range of $1*10^1$ sec$^{-1}$ or more and $5*10^5$ sec$^{-1}$ or less, where * represents multiplication, and the predetermined range of the injection velocity is 0.05 mm·sec$^{-1}$ or more and 200 mm·sec$^{-1}$ or less.

14. The viscosity measurement method as claimed in claim 13, wherein the three or more values $\gamma_k$ of of the shear rate are five values, which are $R*10^1$ sec$^{-1}$, $R*10^2$ sec$^{-1}$, $R*10^3$ sec$^{-1}$, $R*10^4$ sec$^{-1}$, and $R*10^5$ sec$^{-1}$, R being a number of 1 or more and 5 or less.

15. The viscosity measurement method as claimed in claim 12, wherein the process of obtaining the pressure value comprises a process of switching among two or more dies, each of which is a destination for introducing the molding material via the measurement cylinder, and obtaining the pressure values individually.

16. The injection molding machine as claimed in claim 1, further comprising a display device, wherein the control device is configured to display the value of the injection velocity $V_k$ within the predetermined range on the display device.

17. The injection molding machine as claimed in claim 1, wherein the three of more values $\gamma_k$ of of the shear rate are values selected within a range of $1*10^1$ sec$^{-1}$ or more and $5*10^5$ sec$^{-1}$ or less, where * represents multiplication, and the predetermined range of the injection velocity is 0.05 mm·sec$^{-1}$ or more and 200 mm·sec$^{-1}$ or less.

18. The injection molding machine as claimed in claim 17, wherein the three or more values $\gamma_k$ of of the shear rate are five values, which are $R*10^1$ sec$^{-1}$, $R*10^2$ sec$^{-1}$, $R*10^3$ sec$^{-1}$, $R*10^4$ sec$^{-1}$, and $R*10^5$ sec$^{-1}$, R being a number of 1 or more and 5 or less.

19. The injection molding machine as claimed in claim 1, wherein the injection molding machine is a screw preplasticating injection molding machine, and the injection shaft is a plunger.

20. The injection molding machine as claimed in claim 1, wherein the injection molding machine is an inline screw type injection molding machine, and the injection shaft is an inline screw.

* * * * *